(12) United States Patent
Lev-Tov et al.

(10) Patent No.: US 10,311,859 B2
(45) Date of Patent: Jun. 4, 2019

(54) MATERIAL SELECTION FOR LANGUAGE MODEL CUSTOMIZATION IN SPEECH RECOGNITION FOR SPEECH ANALYTICS

(71) Applicant: Genesys Telecommunications Laboratories, Inc., Daly City, CA (US)

(72) Inventors: Amir Lev-Tov, Bat-Yam (IL); Avraham Faizakof, Kefar Varburg (IL); Tamir Tapuhi, Ashdod (IL); Yochai Konig, San Francisco, CA (US)

(*) Notice: Subject to any disclaimer, the term of this patent is extended or adjusted under 35 U.S.C. 154(b) by 23 days.

(21) Appl. No.: 15/247,656

(22) Filed: Aug. 25, 2016

(65) Prior Publication Data

US 2017/0206891 A1 Jul. 20, 2017

Related U.S. Application Data

(60) Provisional application No. 62/279,671, filed on Jan. 16, 2016.

(51) Int. Cl.
| | | |
|---|---|---|
| *G06F 17/24* | (2006.01) | |
| *G10L 15/06* | (2013.01) | |
| *G10L 15/26* | (2006.01) | |
| *G06F 17/27* | (2006.01) | |
| *G06N 20/00* | (2019.01) | |
| *G10L 15/08* | (2006.01) | |
| *G10L 15/183* | (2013.01) | |

(52) U.S. Cl.
CPC .......... *G10L 15/063* (2013.01); *G06F 17/273* (2013.01); *G06N 20/00* (2019.01); *G10L 15/26* (2013.01); *G10L 15/183* (2013.01); *G10L 2015/0635* (2013.01); *G10L 2015/0636* (2013.01); *G10L 2015/088* (2013.01)

(58) Field of Classification Search
None
See application file for complete search history.

(56) References Cited

U.S. PATENT DOCUMENTS

| | | | | |
|---|---|---|---|---|
| 8,719,016 | B1* | 5/2014 | Ziv | G10L 15/26 |
| | | | | 704/235 |
| 9,154,623 | B1* | 10/2015 | Ouimette | H04M 3/5166 |
| 9,191,508 | B1* | 11/2015 | Mekonnen | H04M 3/428 |
| 9,225,833 | B1* | 12/2015 | Koster | H04M 3/5175 |
| 9,407,758 | B1* | 8/2016 | Pycko | H04M 3/16 |
| 9,456,083 | B1* | 9/2016 | Ouimette | H04M 3/5175 |
| 9,674,357 | B1* | 6/2017 | Pycko | H04M 3/5175 |
| 9,692,895 | B1* | 6/2017 | Ouimette | H04M 3/5175 |
| 2011/0074574 | A1* | 3/2011 | Becker | G06F 9/454 |
| | | | | 340/540 |
| 2012/0041764 | A1* | 2/2012 | Xu | G10L 15/065 |
| | | | | 704/256.1 |

(Continued)

OTHER PUBLICATIONS

Katz, Slava M., Estimation of Probabilities from Sparse Data for the Language Model Component of a Speech Recognizer, IEEE Transactions on Acoustics, Speech and Signal Processing vol. ASSP-35, No. 3, 1987, 2 pages.

(Continued)

*Primary Examiner* — Marcus T Riley

(57) ABSTRACT

A method for extracting, from non-speech text, training data for a language model for speech recognition includes: receiving, by a processor, non-speech text; selecting, by the processor, text from the non-speech text; converting, by the processor, the selected text to generate converted text comprising a plurality of phrases consistent with speech transcription text; training, by the processor, a language model using the converted text; and outputting, by the processor, the language model.

18 Claims, 17 Drawing Sheets

(56) References Cited

U.S. PATENT DOCUMENTS

| | | | | |
|---|---|---|---|---|
| 2012/0232884 | A1* | 9/2012 | Nasukawa | G06F 17/2809 704/8 |
| 2014/0164899 | A1* | 6/2014 | Emanuel | G06F 17/241 715/230 |
| 2014/0188462 | A1* | 7/2014 | Zadeh | G06N 7/02 704/9 |
| 2014/0267045 | A1* | 9/2014 | Grieves | G06F 17/2735 345/168 |
| 2014/0278349 | A1* | 9/2014 | Grieves | G06F 17/2735 704/8 |
| 2015/0309984 | A1* | 10/2015 | Bradford | G06F 17/2863 704/8 |
| 2016/0188672 | A1* | 6/2016 | Lev | G06F 16/90332 707/728 |
| 2017/0206890 | A1* | 7/2017 | Tapuhi | G10L 15/063 |

OTHER PUBLICATIONS

Manning, Christopher D. et al., Scoring, term weighting and the vector space model, An Introduction to Information Retrieval, Online edition (c) 2009 Cambridge UP, 27 pages.

Moore, Robert C. et al., Intelligent Selection of Language Model Training Data, Proceedings of the ACL 2010 Conference Short Papers, Association for Computational Linguistics, Jul. 11, 2010, 5 pages.

Niesler, Thomas et al., Unsupervised Language Model Adaptation for Lecture Speech Transcription, Training 144.38h, 2002, 4 pages.

Padro, Lluis et al., FreeLing 3.0: Towards Wider Multilinguality, LRCEC2012, 2012, 7 pages.

Ramos, Juan, Using TF-IDF to Determine Word Relevance in Document Queries, Proceedings of the first instructional conference on machine learning, 2003, 4 pages.

Rousseeuw, J., Silhouettes: a graphical aid to the interpretation and validation of cluster analysis, Elsevier Science Publishers B.V., 1987, North-Holland, 13 pages.

Sethy, Abhinav et al., An Iterative Relative Entropy Minimization-Based Data Selection Approach for n-Gram Model Adaptation, IEEE Transactions on Audio, Speech, and Language Processing vol. 17., No. 1, 2009, 11 pages.

Siohan, Olivier et al., iVector-based Acoustic Data Selection, Interspeech, 2013, 5 pages.

* cited by examiner

MATERIAL SELECTION FOR LANGUAGE MODEL CUSTOMIZATION IN SPEECH RECOGNITION FOR SPEECH ANALYTICS

CROSS-REFERENCE TO RELATED APPLICATION(S)

This application claims the benefit of U.S. Provisional Patent Application No. 62/279,671, filed in the United States Patent and Trademark Office on Jan. 16, 2016, the entire disclosure of which is incorporated herein by reference.

FIELD

Aspects of embodiments of the present invention relate to the field of software for operating contact centers, in particular, software for performing speech recognition and analytics on voice interactions occurring in a contact center and methods for the automated and assisted configuration of such software and services.

BACKGROUND

Generally, a contact center is staffed with agents who serve as an interface between an organization, such as a company, and outside entities, such as customers. For example, human sales agents at contact centers may assist customers in making purchasing decisions and may receive purchase orders from those customers. Similarly, human support agents at contact centers may assist customers in solving problems with products or services provided by the organization. Interactions between contact center agents and outside entities (customers) may be conducted by speech voice (e.g., telephone calls or voice over IP or VoIP calls), video (e.g., video conferencing), text (e.g., emails and text chat), or through other media.

SUMMARY

Aspects of embodiments of the present invention are directed to systems and methods for automatically converting speech to text and systems and methods for performing voice analytics in a contact center.

According to one embodiment of the present invention, a method for extracting, from non-speech text, training data for a language model for speech recognition includes: receiving, by a processor, non-speech text; selecting, by the processor, text from the non-speech text; converting, by the processor, the selected text to generate converted text including a plurality of phrases consistent with speech transcription text; training, by the processor, a language model using the converted text; and outputting, by the processor, the language model.

The non-speech text may include at least one of: an email; a forum post; a transcript of a text chat interaction; and a text message.

The converting the selected text may include: removing metadata from the non-speech text; splitting the non-speech text into a plurality of sentences; converting one or more words of the sentences to spoken form; correcting one or more spelling errors in the sentences; identifying one or more duplicate sentences; and removing duplicate sentences.

The selecting the text may include: for each in-vocabulary word in a lexicon of in-vocabulary word, identifying one or more sentences containing the in-vocabulary word; counting the one or more sentences to identify a count of the in-vocabulary word in the non-speech text; comparing the count to a first threshold; and adding the identified one or more sentences containing the in-vocabulary word in response to determining that the count satisfies the first threshold; identifying one or more out-of-vocabulary words including words that are in the sentences and not in the lexicon; for each out-of-vocabulary word of the out-of-vocabulary words: identifying one or more sentences containing the out-of-vocabulary word; counting the one or more sentences to identify a count of the out-of-vocabulary word in the non-speech text; comparing the count to a second threshold; computing a first likelihood of encountering the out-of-vocabulary word in the sentence among all of the identified sentences; identifying one or more spelling suggestions for the out-of-vocabulary word; computing a plurality of second likelihoods, each of the second likelihoods corresponding to a second likelihood of encountering each of the spelling suggestions in the sentence; adding the identified sentences to an output set of selected text in response to determining that the count satisfies the threshold and that at all of the second likelihoods are less than the first likelihood; and outputting the output set of selected text.

The computing the first likelihood may include counting occurrences of the out-of-vocabulary word preceded by one or more history words in the non-speech text; and wherein the computing one of the second likelihoods including counting occurrences of a corresponding spelling suggestion of the spelling suggestions preceded by the one or more history words in the non-speech text.

According to one embodiment of the present invention, a method for selecting, from non-speech text, training data for a language model for speech recognition includes: training, by a processor, a non-speech language model based on the non-speech text; for each unique sentence of the non-speech text: computing and normalizing, by the processor, an out-of-domain score of the unique sentence based on non-speech language model; computing and normalizing, by the processor, an in-domain score of the unique sentence based on a speech transcription language model trained based on generic speech transcription training data; comparing, by the processor, the out-of-domain score to the in-domain score; and adding, by the processor, the unique sentence to an output set of selected text in response to determining that the in-domain score exceeds the out-of-domain score by a threshold; and outputting, by the processor, the output set of selected text.

The method may further include scaling a count of each unique sentence in the output set by P(s), where:

$$P(s) = e^{IDScr'}$$

where s is the unique sentence and where IDScr' is the in-domain score of the unique sentence.

According to one embodiment of the present invention, a method for selecting, from non-speech text, training data for a language model for speech recognition may include: initializing, by a processor, an output set of selected text based a plurality of sentences sampled from the non-speech text; for each unique sentence of the non-speech text: computing, by the processor, a first divergence between an in-domain language model trained on generic speech transcript text the unique sentence and a language model trained on the output set; computing, by the processor, a second divergence between the in-domain language model and a language model trained on the output set combined with the unique sentence; comparing, by the processor, the first divergence and the second divergence; and adding, by the processor, the sentence to the output set in response to determining that the second divergence in less than the first divergence; and outputting, by the processor, the output set of selected text.

According to one embodiment of the present invention, a system includes: a processor; memory storing instructions that, when executed by the processor, cause the processor to: receive non-speech text; select text from the non-speech text; convert the selected text to generate converted text including a plurality of phrases consistent with speech transcription text; train a language model using the converted text; and output the language model.

The memory may further store instructions that, when executed by the processor, cause the processor to convert the selected text by: removing metadata from the non-speech text; splitting the non-speech text into a plurality of sentences; converting one or more words of the sentences to spoken form; correcting one or more spelling errors in the sentences; identifying one or more duplicate sentences; and removing duplicate sentences.

The memory may further store instructions that, when executed by the processor, cause the processor to select the text by: for each in-vocabulary word in a lexicon of in-vocabulary words, identifying one or more sentences containing the in-vocabulary word; counting the one or more sentences to identify a count of the in-vocabulary word in the non-speech text; comparing the count to a first threshold; and adding the identified one or more sentences containing the in-vocabulary word in response to determining that the count satisfies the first threshold; identifying one or more out-of-vocabulary words including words that are in the sentences and not in the lexicon; for each out-of-vocabulary word of the out-of-vocabulary words: identifying one or more sentences containing the out-of-vocabulary word; counting the one or more sentences to identify a count of the out-of-vocabulary word in the non-speech text; comparing the count to a second threshold; computing a first likelihood of encountering the out-of-vocabulary word in the sentence among all of the identified sentences; identifying one or more spelling suggestions for the out-of-vocabulary word; computing a plurality of second likelihoods, each of the second likelihoods corresponding to a second likelihood of encountering each of the spelling suggestions in the sentence; adding the identified sentences to an output set of selected text in response to determining that the count satisfies the threshold and that at all of the second likelihoods are less than the first likelihood; and outputting the output set of selected text.

According to one embodiment of the present invention, a system includes: a processor; and memory storing instructions that, when executed by the processor, cause the processor to: train a non-speech language model based on the non-speech text; for each unique sentence of the non-speech text: compute and normalize an out-of-domain score of the unique sentence based on non-speech language model; compute and normalize an in-domain score of the unique sentence based on a speech transcription language model trained based on generic speech transcription training data; compare the out-of-domain score to the in-domain score; and add the unique sentence to an output set of selected text in response to determining that the in-domain score exceeds the out-of-domain score by a threshold; and output the output set of selected text.

The memory may further store instructions that, when executed by the processor, cause the processor to scale a count of each unique sentence in the output set by P(s), where:

$$P(s) = e^{IDScr'}$$

where s is the unique sentence and where IDScr' is the in-domain score of the unique sentence.

According to one embodiment of the present invention, a system includes: a processor; and memory storing instructions that, when executed by the processor, cause the processor to: initialize an output set of selected text based a plurality of sentences sampled from the non-speech text; for each unique sentence of the non-speech text: compute a first divergence between an in-domain language model trained on generic speech transcript text the unique sentence and a language model trained on the output set; compute a second divergence between the in-domain language model and a language model trained on the output set combined with the unique sentence; compare the first divergence and the second divergence; and add the sentence to the output set in response to determining that the second divergence in less than the first divergence; and output the output set of selected text.

The memory may further store instructions that, when executed by the processor, cause the processor to compute the second divergence by calculating a cross-entropy of the in-domain language model and the language model trained on the output set.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Figure 1:
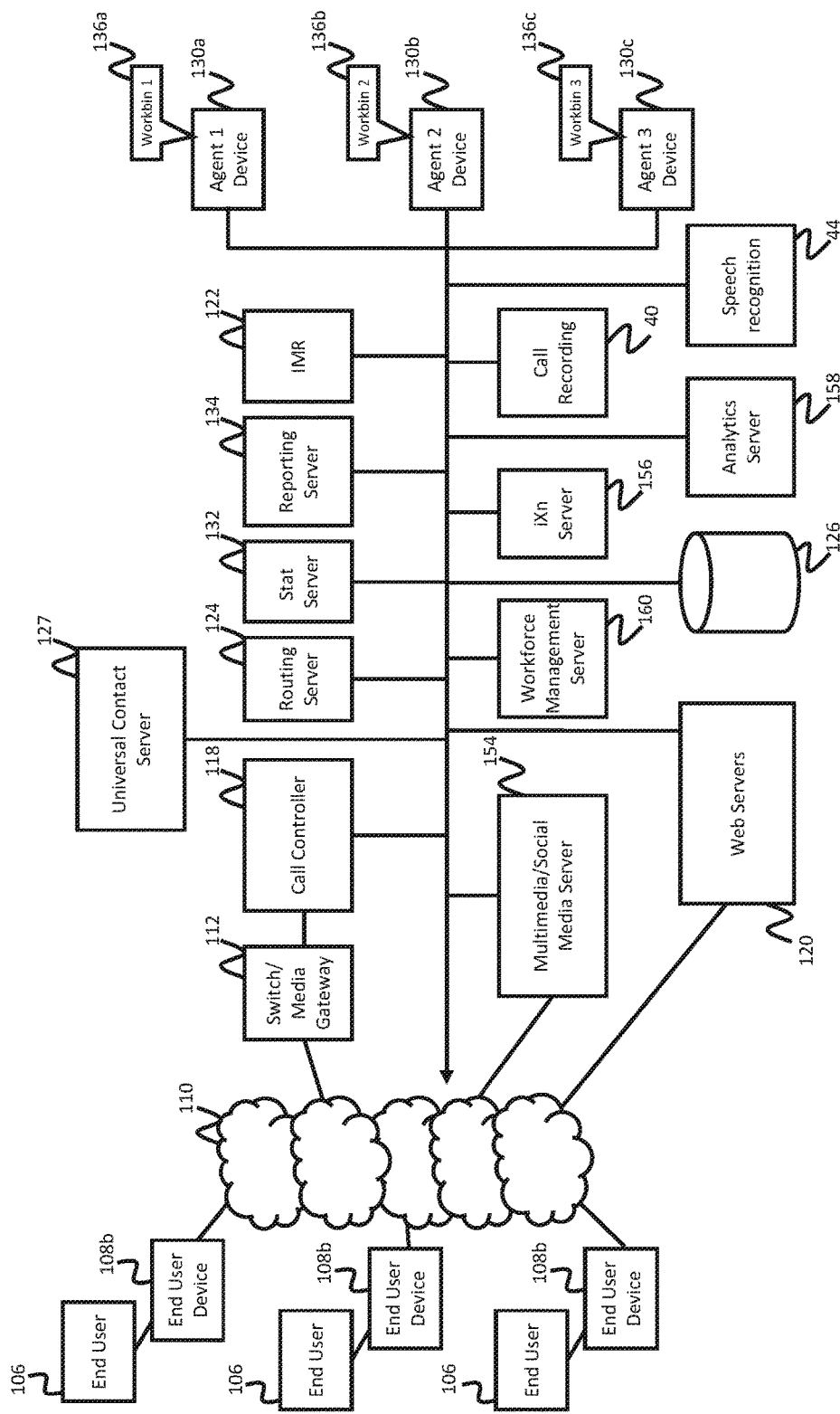
FIG. 1 is a schematic block diagram of a system for supporting a contact center in providing contact center services according to one exemplary embodiment of the invention.

In the following detailed description, only certain exemplary embodiments of the present invention are shown and described, by way of illustration. As those skilled in the art would recognize, the invention may be embodied in many different forms and should not be construed as being limited to the embodiments set forth herein. Like reference numerals designate like elements throughout the specification.

Generally, speech analytics systems have several use cases. In one use case, speech analytics can be used to classify customer-agent conversations into predefined categories. For example, a customer's phrases such as "I want to speak to your supervisor" and "I am very angry" may indicate an event of customer dissatisfaction, and phrases such as "thank you for taking care of this" may indicate a successful resolution. Similarly, an agent's phrases such as "would you like to upgrade to a higher tier plan?" and "may I suggest another model?" may indicate upselling events and cursing or calling a customer "stupid" or an "idiot" may be grounds for flagging the agent for reprimand or further supervisor review.

In another use case, automatically transcribed conversations can be searched for particular terms (e.g., for instances of particular words). In still another use case, new categories or topics can be automatically detected from the automatically recognized speech in order to allow an organization to identify phenomena (potentially new, previously untracked phenomena) that may be occurring during customer-agent interactions (e.g., in the corpora of recorded interactions).

Due to the difficulties in processing speech from a wide range of speakers who may use different pronunciations of words, who may speak at different speeds and at different pitches, and who my speak with different accents, a universal model for accurately recognizing speech can be very large and may often be shared by many different organizations who may have very different businesses (e.g., a pet supply company may be very different from a company that sells computer software compilers).

However, this universal language model may also be unable to accurately recognize phrases and speech patterns that are particular to certain verticals or industries (e.g., words or phrases relating to pet supplies, such as "kibble," "aquarium," and "bedding" versus words or phrases relating to compilers, such as "segfault," "monad," and "runtime.").

In addition, it may be difficult to determine whether a given phrase appears in a transcription of spoken conversations, due to the wide variability in ways that the phrase may be said and due to the poor performance of the universal speech models on context specific words (e.g., the word "segfault" may be incorrectly recognized as "steak sauce" if the speech recognition system is not tailored for the context of computer programming).

As such, aspects of embodiments of the present invention are directed to systems and methods for customizing or tailoring a speech recognition system based on knowledge of the context in which the speech recognition system is applied. For example, knowledge about typical requests of pet owners and words and phrases used by pet owners may be provided to a speech recognition system according to embodiments of the present invention in order to customize a speech recognition system expected to encounter interactions involving pet owners (e.g., the contact center for a chain of pet stores). This customization allows the speech recognition system to increase the likelihood of some phrases and decrease the likelihood of other phrases, and thereby increasing the accuracy of the output of the speech recognizer. The data for this customization can come from both in-medium data and out-of-medium data. For example, in embodiments of the present invention in which the "medium" is speech (e.g., voice interactions), in-medium training data may be existing text transcriptions of voice interactions in the context of the organization (which is generally a small amount of data due to the expense of generating such transcriptions), and the out-of-medium data include textual (or text) data other than text transcriptions of voice interactions (e.g., text chats, emails, forum posts, and data scraped from the organization website), and this out-of-medium data may be referred to as "non-speech text."

Aspects of embodiments of the present invention are also directed to systems and methods for supplementing the training data of a speech recognition system using voice data and transcripts of the voice data from sources outside of the organization (also referred to herein as global in-medium training materials). For example, recorded voice interactions and transcripts of those voice interactions from a variety of contact centers such as banks, consumer electronics manufacturers, telecommunications providers, retail sales companies, and pharmacies may all be available for training a speech recognition system. In some embodiments of the present invention, the existing training data may be used to train a speech recognition system for use with a new contact center for a particular organization. However, in many instances, these data are not tailored to the expected content of the interactions of the organization. For example, the phrase "bank statement" is unlikely to occur in interactions with a retail sales company. Therefore, some aspects of embodiments of the present invention are directed to using existing training data to customize a speech recognition system in ways that take into account the expected content of the data that will be encountered by the speech recognition system.

Aspects of embodiments of the present invention may also include: adding context specific information to the language model of the speech recognition system to emphasize the importance of the context specific information; searching for context specific topics in the interactions (e.g., large vocabulary continuous speech recognition (LVCSR), chat, email, social media, etc.) of the organization, taking into account possible speech recognition errors and acceptable variants of phrases; and incorporating wild cards into the search, so as to enable the discovery of regular expressions on the text.

Aspects of embodiments of the present invention are also related to adding organization-specific data to the language model in a way that emphasizes the importance of the organization-specific data. For example, the global training material is generally a different size than the organization specific training material and/or the context specific training material (e.g., the global training material is generally a much larger data set than the organization specific or context specific training material). As such, some aspects of embodiments of the present invention relate to systems and methods for assigning weights to the different sources of training material in accordance with their relative size and in accordance with their relative importance. This technique may be referred to herein as "interpolation." In addition, interpolation may be used in the customization of the language model described above for "time zero" customization of the language model and on-going customization of the language model, in which the organization-specific training data includes no in-medium training data (e.g., because the organization has not been operating a contact center, has not been collecting in-medium data, or has not collected enough in-medium training data to be worthwhile to include the data).

Contact Center Overview

FIG. 1 is a schematic block diagram of a system for supporting a contact center in providing contact center services according to one exemplary embodiment of the invention. The contact center may also be referred to as a customer contact center. The contact center may be an in-house facility to a business or enterprise for serving the enterprise in performing the functions of sales and service relative to the products and services available through the enterprise. In another aspect, the contact center may be operated by a third-party service provider. According to some embodiments, the contact center may operate as a hybrid system in which some components of the contact center system are hosted at the contact center premise and other components are hosted remotely (e.g., in a cloud-based environment). The contact center may be deployed in equipment dedicated to the enterprise or third-party service provider, and/or deployed in a remote computing environment such as, for example, a private or public cloud environment with infrastructure for supporting multiple contact centers for multiple enterprises. The various components of the contact center system may also be distributed across various geographic locations and computing environments and not necessarily contained in a single location, computing environment, or even computing device.

For the purposes of the discussion herein, interactions between customers using end user devices 10 and agents at a contact center using agent devices 38 may be recorded by call recording module 40 and stored in mass storage device 126. The recorded calls may be processed by speech recognition module 44 to generate recognized text which is stored in the mass storage device 126. In some embodiments of the present invention, a voice analytics module 45, may include a text search module, which will be described in more detail below. For the purposes of the discussion herein, interactions between customers using end user devices 10 and agents at a contact center using agent devices 38 may be recorded by call recording module 40 and stored in the mass storage device 126. The recorded calls may be processed by speech recognition module 44 to generate recognized text which is stored in the mass storage device 126. In some embodiments of the present invention, a voice analytics module 45 configured to perform analytics on recognized speech data such as by detecting events occurring in the interactions and categorizing the interactions in accordance with the detected events. Aspects of speech analytics systems are described, for example, in U.S. patent application Ser. No. 14/586,730 "System and Method for Interactive Multi-Resolution Topic Detection and Tracking," filed in the United States Patent and Trademark Office on Dec. 30, 2014, the entire disclosure of which is incorporated herein by reference.

According to one example embodiment, the contact center system manages resources (e.g. agents, support personnel, computers, telecommunications equipment, mobile devices, internet-of-things devices, and self-service resources) to enable delivery of services via telephone or other communication mechanisms. Such services may vary depending on the type of contact center, and may range from customer service to help desk, emergency response, telemarketing, order taking, and the like.

Customers, potential customers, or other end users (collectively referred to as customers or end users, e.g., end users 106) desiring to receive services from the contact center may initiate inbound communications (e.g., telephony calls) to the contact center via their end user devices 108a-108c (collectively referenced as 108). Each of the end user devices 108 may be a communication device conventional in the art, such as, for example, a telephone, wireless phone, smart phone, personal computer, electronic tablet, and/or the like. Users operating the end user devices 108 may initiate, manage, and respond to telephone calls, emails, chats, text messaging, web-browsing sessions, and other multi-media transactions.

Inbound and outbound communications from and to the end user devices 108 may traverse a telephone, cellular, and/or data communication network 110 depending on the type of device that is being used, where these devices may include internet-of-things (IoT) devices. For example, the communications network 110 may include a private or public switched telephone network (PSTN), local area network (LAN), private wide area network (WAN), and/or public wide area network such as, for example, the Internet. The communications network 110 may also include a wireless carrier network including a code division multiple access (CDMA) network, global system for mobile communications (GSM) network, or any wireless network/technology conventional in the art, including but to limited to 3G, 4G, LTE, and the like. Various communications protocols may be used on these networks.

According to one example embodiment, the contact center includes a switch/media gateway 112 coupled to the communications network 110 for receiving and transmitting telephony calls between end users and the contact center. The switch/media gateway 112 may include a telephony switch or communication switch configured to function as a central switch for agent level routing within the center. The switch may be a hardware switching system or a soft switch implemented via software. For example, the switch 112 may include an automatic call distributor, a private branch exchange (PBX), an IP-based software switch, and/or any other switch with specialized hardware and software configured to receive Internet-sourced interactions and/or telephone network-sourced interactions from a customer, and route those interactions to, for example, an agent telephony or communication device. In this example, the switch/media gateway establishes a voice path/connection (not shown) between the calling customer and the agent telephony device, by establishing, for example, a connection between the customer's telephony device and the agent telephony device.

According to one exemplary embodiment of the invention, the switch is coupled to a call controller 118 which may, for example, serve as an adapter or interface between the switch and the remainder of the routing, monitoring, and other communication-handling components of the contact center.

The call controller 118 may be configured to process PSTN calls, VoIP calls, and the like. For example, the communication server 118 may be configured with computer-telephony integration (CTI) software for interfacing with the switch/media gateway and contact center equipment. In one embodiment, the call controller 118 may include a session initiation protocol (SIP) server for processing SIP calls. According to some exemplary embodiments, the call controller 118 may, for example, extract data about the customer interaction such as the caller's telephone number, often known as the automatic number identification (ANI) number, or the customer's internet protocol (IP) address, or email address, and communicate with other CC components in processing the interaction.

According to one exemplary embodiment of the invention, the system further includes an interactive media response (IMR) server 122, which may also be referred to as a self-help system, virtual assistant, or the like. The IMR server 122 may be similar to an interactive voice response (IVR) server, except that the IMR server 122 is not restricted to voice, but may cover a variety of media channels including voice. Taking voice as an example, however, the IMR server 122 may be configured with an IMR script for querying customers on their needs. For example, a contact center for a bank may tell customers, via the IMR script, to "press 1" if they wish to get an account balance. If this is the case, through continued interaction with the IMR server 122, customers may complete service without needing to speak with an agent. The IMR server 122 may also ask an open ended question such as, for example, "How can I help you?" and the customer may speak or otherwise enter a reason for contacting the contact center. The customer's response may then be used by the routing server 124 to route the call or communication to an appropriate contact center resource.

If the communication is to be routed to an agent, the communication server 122 interacts with a routing server 124 to find an appropriate agent for processing the interaction. The selection of an appropriate agent for routing an inbound interaction may be based, for example, on a routing strategy employed by the routing server 124, and further based on information about agent availability, skills, and other routing parameters provided, for example, by a statistics server 132.

In some embodiments, the routing server 124 may query a customer database, which stores information about existing clients, such as contact information, service level agreement (SLA) requirements, nature of previous customer contacts and actions taken by contact center to resolve any customer issues, and the like. The database may be, for example, Cassandra or any NoSQL database, and may be stored in the mass storage device 126. The database may also be a SQL database and may be managed by any database management system such as, for example, Oracle, IBM DB2, Microsoft SQL server, Microsoft Access, PostgreSQL, MySQL, FoxPro, and SQLite. The routing server 124 may query the customer information from the customer database via an ANI or any other information collected by the IMR server 122.

Once an appropriate agent is identified as being available to handle a communication, a connection may be made between the customer and an agent device 130a-130c (collectively referenced as 130) of the identified agent. Collected information about the customer and/or the customer's historical information may also be provided to the agent device for aiding the agent in better servicing the communication. In this regard, each agent device 130 may include a telephone adapted for regular telephone calls, VoIP calls, and the like. The agent device 130 may also include a computer for communicating with one or more servers of the contact center and performing data processing associated with contact center operations, and for interfacing with customers via voice and other multimedia communication mechanisms.

The contact center system may also include a multimedia/social media server 154 for engaging in media interactions other than voice interactions with the end user devices 108 and/or web servers 120. The media interactions may be related, for example, to email, vmail (voice mail through email), chat, voice video, text-messaging, web, social media, co-browsing, and the like. In this regard, the multimedia/social media server 154 may take the form of any IP router conventional in the art with specialized hardware and software for receiving, processing, and forwarding multi-media events.

The web servers 120 may include, for example, social interaction site hosts for a variety of known social interaction sites to which an end user may subscribe, such as, for example, Facebook, Twitter, and the like. In this regard, although in the embodiment of FIG. 1 the web servers 120 are depicted as being part of the contact center system, the web servers may also be provided by third parties and/or maintained outside of the contact center premise. The web servers may also provide web pages for the enterprise that is being supported by the contact center. End users may browse the web pages and get information about the enterprise's products and services. The web pages may also provide a mechanism for contacting the contact center, via, for example, web chat, voice call, email, web real time communication (WebRTC), or the like.

According to one exemplary embodiment of the invention, in addition to real-time interactions, deferrable (also referred to as back-office or offline) interactions/activities may also be routed to the contact center agents. Such deferrable activities may include, for example, responding to emails, responding to letters, attending training seminars, or any other activity that does not entail real time communication with a customer. In this regard, an interaction (iXn) server 156 interacts with the routing server 124 for selecting an appropriate agent to handle the activity. Once assigned to an agent, an activity may be pushed to the agent, or may appear in the agent's workbin 136a-136c (collectively referenced as 136) as a task to be completed by the agent. The agent's workbin may be implemented via any data structure conventional in the art, such as, for example, a linked list, array, and/or the like. The workbin 136 may be maintained, for example, in buffer memory of each agent device 130.

According to one exemplary embodiment of the invention, the mass storage device(s) 126 may store one or more databases relating to agent data (e.g. agent profiles, schedules, etc.), customer data (e.g. customer profiles), interaction data (e.g. details of each interaction with a customer, including reason for the interaction, disposition data, time on hold, handle time, etc.), and the like. The mass storage device may also store a floor plan of the physical contact center, and/or other physical characteristics and/or configuration of the contact center. According to one embodiment, some of the data (e.g. customer profile data) may be maintained in a customer relations management (CRM) database hosted in the mass storage device 126 or elsewhere. The mass storage device may take form of a hard disk or disk array as is conventional in the art.

According to some embodiments, the contact center system may include a universal contact server (UCS) 127, configured to retrieve information stored in the CRM database and direct information to be stored in the CRM database. The UCS 127 may also be configured to facilitate maintaining a history of customers' preferences and interaction history, and to capture and store data regarding comments from agents, customer communication history, and the like.

The contact center system may also include a reporting server 134 configured to generate reports from data aggregated by the statistics server 132. Such reports may include near real-time reports or historical reports concerning the state of resources, such as, for example, average waiting time, abandonment rate, agent occupancy, and the like. The reports may be generated automatically or in response to specific requests from a requestor (e.g. agent/administrator, contact center application, and/or the like).

The contact center system may also include an analytics server 158 that automatically processes interactions between the end users 106 and agents of the contact center to generate interaction data regarding the interactions, including the reason for the interaction, topics discussed during the interaction, customer sentiment, agent sentiment, interaction escalation rates, etc. The analytics server 158 may include a voice analytics component configured to recognize speech in voice or audio interactions between the end users 106 and the agents of the contact center in order to detect events in the voice or audio interactions. The analytics data generated by the analytics server 158 may be provided to the statistics server 132 and may be stored on the mass storage device 126 or elsewhere.

The contact center system may also include a workforce management server 160 (or workforce management system or employee engagement system or workforce optimization system) to generate work schedules for agents in accordance with expected interaction or call volumes and in accordance with agent skills (e.g., language or technical skills), scheduling information (e.g., agent starting, ending, and break times), or other information that may be useful to improve the efficacy of routing tasks. For example, in a contact center that operates 24 hours per day, a reduced call volume may be expected during the nighttime hours than the daytime hours, and therefore the staff size may be smaller. As another example, when a company releases a new product, technical support staffing may be increased to handle expected increased traffic from customers requesting help in setting up the new products.

The workforce management server 160 may also provide a user interface to allow a human supervisor or administrator to visualize and to generate agent work schedules in accordance with the agent data and expected demand. The workforce management server 160 may also provide a user interface for agents to, for example, submit preferences such as shift scheduling preferences, submit requests for time off (e.g., sick time and vacation time), and view assigned work schedules. The user interface may be, for example, web server software that provides a web interface to the workforce management server 160, an application programming interface (API) that allows access from a client program, or other known techniques for providing user interfaces to computer systems.

The various servers of FIG. 1 may each include one or more processors executing computer program instructions and interacting with other system components for performing the various functionalities described herein. The computer program instructions are stored in a memory implemented using a standard memory device, such as, for example, a random access memory (RAM). The computer program instructions may also be stored in other non-transitory computer readable media such as, for example, a CD-ROM, flash drive, or the like. Also, although the functionality of each of the servers is described as being provided by the particular server, a person of skill in the art should recognize that the functionality of various servers may be combined or integrated into a single server, or the functionality of a particular server may be distributed across one or more other servers without departing from the scope of the embodiments of the present invention.

In the various embodiments, the terms "interaction" and "communication" are used interchangeably, and generally refer to any real-time and non-real time interaction that uses any communication channel including, without limitation telephony calls (PSTN or VoIP calls), emails, vmails (voice mail through email), video, chat, screen-sharing, text messages, co-browsing (e.g., the customer and agent viewing the same web pages together, where an action taken by either the customer or the agent updates the views seen by both the customer and the agent), social media messages, web real-time communication (e.g., WebRTC calls), and the like.

Customizing a Language Model

Figure 2:
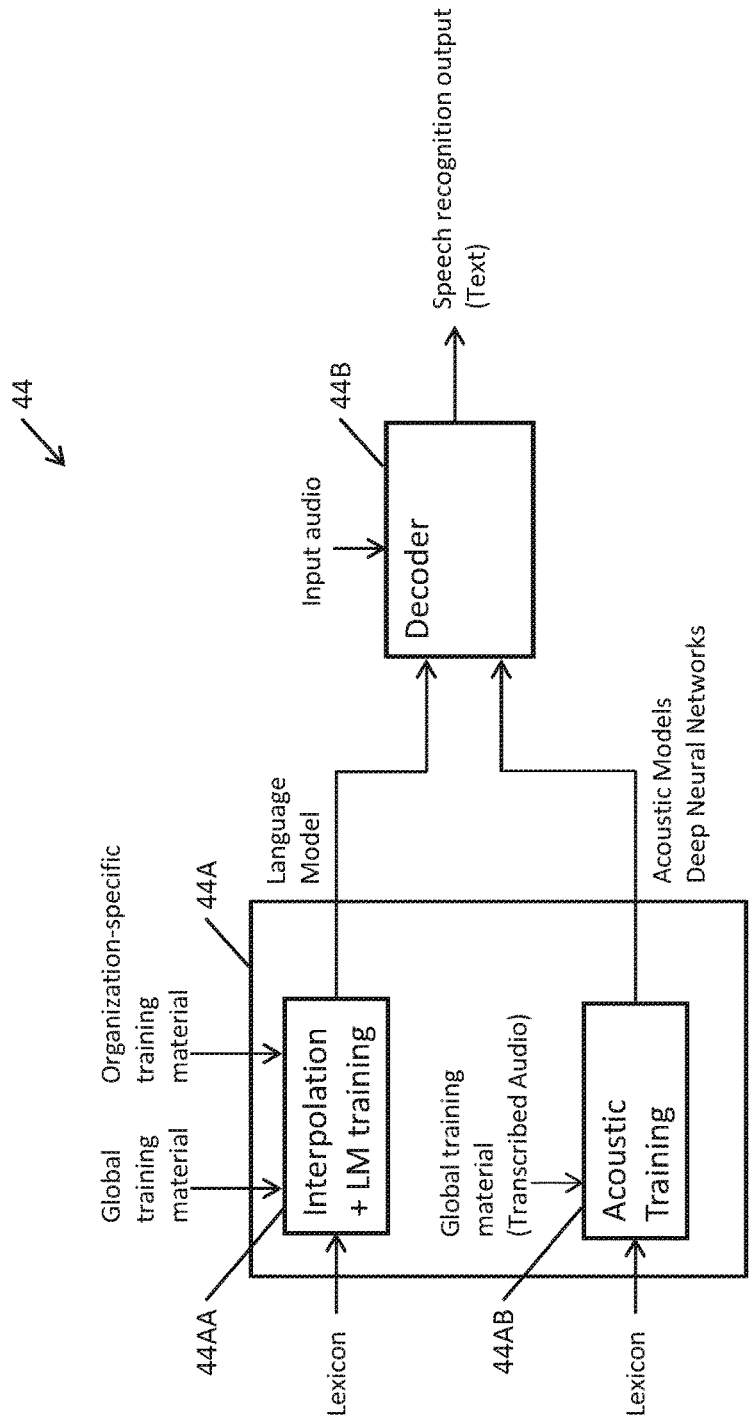
FIG. 2 is a block diagram illustrating a speech recognition engine and training modules for a speech recognition engine according to one embodiment of the present invention.

FIG. 2 is a schematic diagram of a speech recognition engine 44 according to one embodiment of the present invention. The speech recognition engine may also be referred to as an automatic speech recognition (ASR) system, which includes large vocabulary continuous speech recognition (LVCSR) systems, although embodiments of the present invention are not limited thereto. Generally, a speech recognition system 44 may include a training module 44A and a decoder module 44B. The training module 44A may include a language model training module 44AA and an acoustic training module 44AB. The language model training module 44AA may generate a language model (LM) and the acoustic training module 44AB may generate an acoustic model (AM) (e.g., a deep neural network).

The decoder module 44B uses the language model and the acoustic model to process input audio and to generate a speech recognition output (e.g., a transcription or text) of the speech that is recognized from the input audio. The decoder module 44B may also use a grapheme to phoneme model (G2P). In particular, the input audio is supplied to the acoustic models, which generate likely phonemes. The decoder 44B combines the output of the acoustic models and the output of the language model, and identifies the likely words spoken in the audio based on the probabilities of various phrases and the phonemes detected in the audio.

In more detail, the acoustic model maps sounds to features (e.g., numerical vectors such as a floating point vector) to identify likely phonemes found within the audio. The identification of the phonemes may be based on "tri-phones" (a sequence of three phonemes) where each phonetic unit includes the current phoneme, the previous phoneme, and next phoneme. The acoustic model is probabilistically mapping acoustic feature vectors into the space of all possible tri-phones in a given language. Using a tri-phone improves performance because some phonemes are more likely to occur before or after certain other phonemes. The acoustic model may also take into account data from the global training material (e.g., the likelihoods of particular phonemes in particular languages, dialects, or accents), where the global training material may include data associated with a particular language (e.g., English, Chinese, or French) and/or a particular region or accent (e.g., American English or Australian English). In one embodiment, the acoustic models are deep neural networks (e.g., neural networks having more than three layers). The acoustic model also takes as input a lexicon, which contains phonetic spellings of words (e.g., multiple phonetic spellings) that may be spoken in the audio. As such, the acoustic training module generates acoustic models using an input lexicon and a collection of audio (e.g., audio collected from prior calls) and corresponding transcription of that audio.

The language model provides information regarding the probability that a given input phrase appears in the context of the input data used to train the language model. Language modeling is generally medium sensitive. For example, a language model trained on transcripts of speech interactions will generally be different from a language model trained on newspaper articles. While it may be relatively easy to mix data from two different sources in the same medium (e.g., transcripts of contact center interactions and transcripts of television programs), mixing two different sources of data from different media (e.g., speech recognition transcripts and emails) requires more careful selection, as described in more detail below. The performance of an automatic speech recognition system is sensitive to different language models in that the performance of the speech recognition can depend on how well the language model matches the actual probabilities of various phrases appearing in the input audio. For example, if the language model was trained using general English language training material, the phrases "How are you?" and "thank you" may be fairly common, whereas "ni hao ma?" (e.g., "How are you?" in Chinese) may be much less common. As another example, a language model generated based on the context of interactions between customers and agents of a contact center would estimate that the sequence of words "will you please verify your address" to have a higher probability than the sequence of words: "my dog likes the park by the river."

As such, when a language model is customized to the context in which it will be operating, it can provide information for differentiating between multiple phrases that sound similar (e.g., utterances that produce similar results from the acoustic model) based on information about the likelihood of various phrases, as encoded in the language model.

In a speech analytics system 45, there may be at least two different corpora of training material. One of these corpora may be referred to herein as "global training material" (or "generic training material" or "general training material") and may include words (e.g., millions of words) collected from a large number of sources (e.g., transcripts of interactions from contact centers of a large number of different organizations), and this "global training material" may be useful for customizing the language model for a particular human language such as English, Spanish, or Mandarin Chinese.

Another corpus of these corpora may contain a set of topics and phrases defined specifically for one particular organization, and may be referred to herein as "organization specific" data (or may be referred to as "organization phrases," "customized phrases," "customer phrases," or "customer training material," where the organization is the "customer"). These organization specific training data include particular topics and phrases that may be of higher value to the particular organization (e.g., for a company that sells compiler software, these may be topics and phrases relating to compilers, software, programming, etc.), and can therefore reduce the ambiguity between two valid phrases that sound alike, but where one transcription may be more likely than another in the context of the organization.

For example, in the context of interactions between customers of a pet supply retailer and its contact center, words or phrases such as: "reptile," "live mice," "my dog won't eat this food, can I return it?", and "can you recommend a brand of cat litter?" might appear more often than would be expected in a typical contact center (or average of all contact centers or the global in-medium training material) and these phrases would therefore not be strongly reflected in the global in-medium training material.

Similarly, in the context of interactions between customers of a software compiler company and the technical support staff of its contact center, words or phrases such as: "compiler," "linker," "regex," "segfault," and "how do I cross-compile my project to a different architecture?" might appear more often than would be expected in a typical contact center (or average of all contact centers) and these phrases would therefore not be strongly reflected in the global in-medium training material.

These language models may be trained on language data from the same medium that they are intended to be used with. For example, a language model for predicting the likelihood of sequences of words spoken in a contact center interaction will be trained on transcripts of voice interactions of the contact center (sometimes referred to as "in-domain" or "in-medium" data), as opposed to other types of language data (e.g., non-voice data) such as transcripts of typed text chats, email exchanges, forum posts, website data, and the like (sometimes referred to as "out-of-domain" or "out-of-medium" data). However, in some circumstances, there may not be sufficient existing data to perform this training, such as in the case of a new contact center that has no existing set of recorded interactions or very few recorded interactions. In some circumstances, the recorded interactions may be available, but it may be expensive to generate the transcripts (because the transcripts are typically manually generated by a human).

The terms "in-domain" and "out-of-domain" or "in-medium" and "out-of-medium" do not constrain whether the data is "organization specific," and therefore there may be "organization specific in-medium data" (e.g., recordings of voice interactions between agents of the organization and its customers, and transcripts thereof), "organization specific out-of-medium data" (e.g., non-voice interaction data of the organization), "non-organization specific in-medium data" (e.g., voice interaction data from other organizations), and "non-organization specific out-of-medium data (e.g., non-voice interaction data from other organizations).

In one approach, the speech recognition engine uses only the global training material, which may include transcripts from a variety of different contact centers, to produce a language model that is not tailored to the context of the organization because it may lack the organization phrases. This general language model may then be used to recognize speech captured from voice interactions with between a customer (e.g., a third party contacting the organization) and an agent to generate speech recognizer output (or "LVCSR output").

However, a speech recognition system 44 using this general language model may exhibit high word error rates (WER) because contact center speech transcript data from one contact center may have low relevance to the context that the speech recognition system is being trained for. For example, a contact center for a pet supply retailer may frequently encounter the phrase "I would like a new leash," but a general language model trained with transcripts from, for example, a large apartment rental company may assign a higher likelihood to the phrase: "I would like a new lease."

Therefore, one challenge of an automatic speech recognition system is to use a language model that is specific enough for the relevant context, yet generic enough to recognize new sentences and words by training a language model with a large volume of reliable data from the same context, such as business or business vertical, as the intended context of the language model. In this way, the speech recognition system can provide better results, such as in the form of lower word error rates. However, generating the corpora of training material, whether global or organization-specific, is generally a long, manual, and expensive process, in which human auditors transcribe real audio recordings (e.g., recordings of voice interactions between customers and agents of an organization) into text.

As such, aspects of embodiments of the present invention are directed to the customization of a generic language model for a target context using data that were manually generated for the target context, existing speech recognition transcripts from the target context (if any), and out-of-medium data from the target context (e.g., data other than speech recognition transcripts from the context of the organization). The target context may be, for example, a target organization using the language model to recognize speech in its contact center. The data generated for the target context may be referred to as the "program" and may include representations of data that are expected to be found in those contexts. For example, an organization may expect phrases relating to specific products in sales and support interactions, whereas the organization may expect phrases relating to account verification, payment, and balances in billing interactions. This "program" information may be used to select a speech recognition system to deploy in accordance with the context of the interaction (e.g., billing versus sales versus support), which each speech recognition system may have a language model tailored for its context. The out-of-medium data from the target context may include, for example, text chat transcripts between customers of the organization and agents, emails between customers and agents, and text information obtained from the organization website and/or sales and support materials.

Generally, embodiments of the present invention are directed to systems and methods for extracting useful training data from the out-of-medium data of the target organization. In addition, embodiments of the present invention are also directed to computing the similarity of the generic or general contact center data to the target context, and using these computed similarities to generate a new language model for the target context. In some embodiments, organization-specific data from other sources within the target context, such as text chats and emails with the organization's agents, the organization's website, and the organization's customer forums, may be used to assist in rating the generic or general contact center data.

Aspects of embodiments of the present invention include the creation of a tailor made language model using "in-medium" data that are ranked and weighted in accordance with its similarity to the target context; using out-of-medium data to assist in ranking the in-medium data and calculating weights; customization of a language model using the "program" of expected topics or topics of interest to the organization; and mixing and weighting several data sets (that may have very different sizes) into one language model. As such, embodiments of the present invention allow customization of a language at "time zero" (e.g., because the organization has not been operating a contact center, before any company specific in-medium data is collected, or before the organization has collected enough in-medium training data to be worthwhile to include the data). Embodiments of the present invention also enable on-going customization of the language model as time passes and new vocabulary is introduced to the system (e.g., in new lines of products dealing with new concepts and new ideas, reorganization and renaming of product lines, new types of problems, and the like). Sources of information for the on-going customization of the language model include the results of the speech recognition output of the voice interactions, emails, text chats, customer forums, frequently asked questions and answers, and the "program" (e.g., topics of interest to the organization and specified in the voice analytics system 45).

Figure 3:
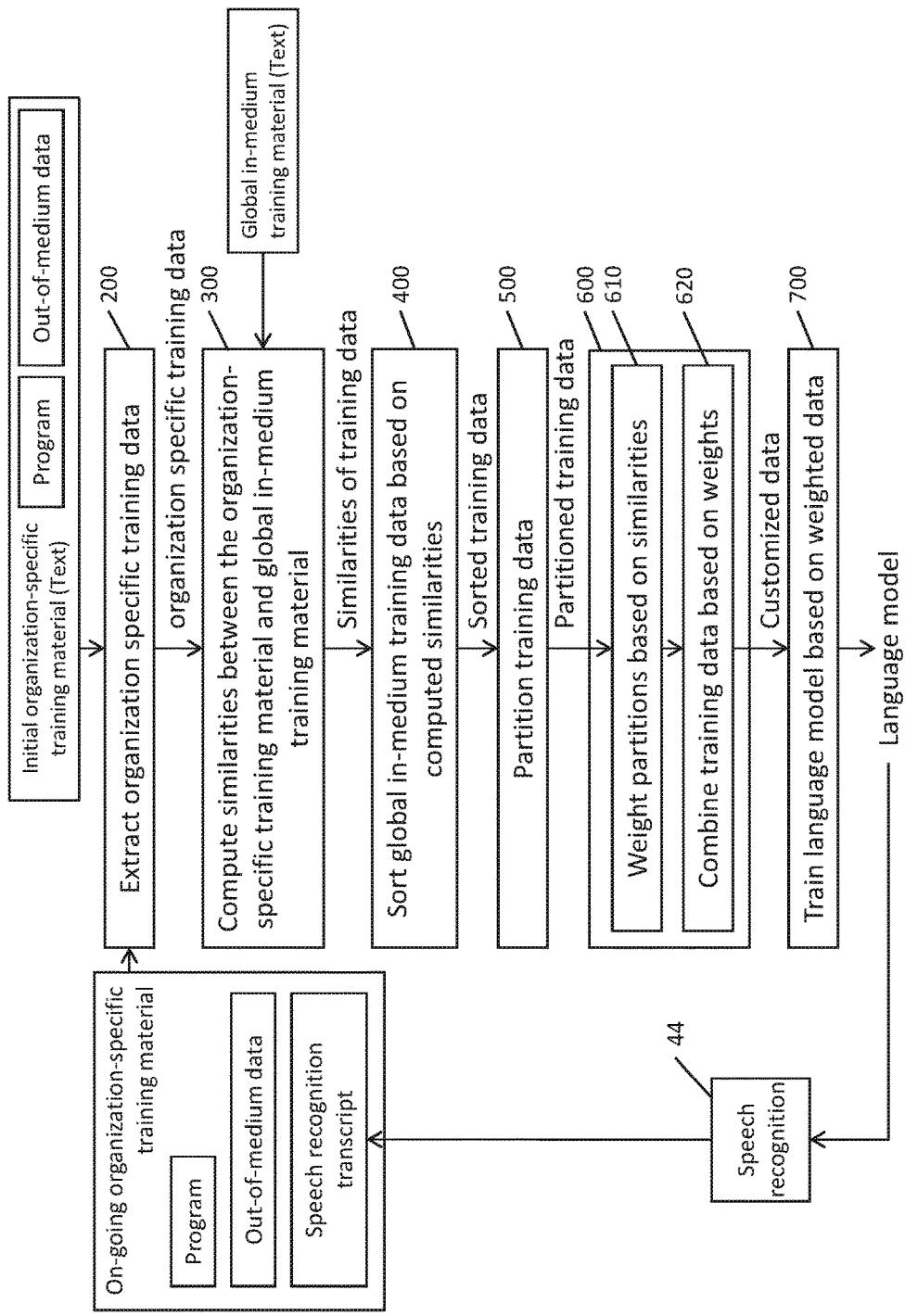
FIG. 3 is a flowchart of a method for generating a customized language model according to one embodiment of the present invention.

FIG. 3 is a flowchart of a method for generating a customized language model according to one embodiment of the present invention. Referring to FIG. 3, the method includes: extracting organization specific training data from initial organization-specific training material in operation 200; computing a similarity between the organization specific training data and the in-medium training data 300; sorting the in-medium training data according to the computed similarities 400; partitioning the training data into partitions 500; weighting the partitions based on interpolation parameters 600, and training a new language model in accordance with weighted training data 700.

In order to customize the language model, in operation 200, the LM training module 44AA obtains organization-specific data. For ongoing customization of the language model, the text output of the speech recognition module 44 can be supplied as organization-specific training data. However, if no such training data is available (e.g., in the "time-zero" situation), then other initial organization specific training material can be used, such as the "program" and existing out-of-medium data (e.g., text chats, emails, text scraped from the organization's website, forum posts, and the like).

The various out-of-medium data and generic data may differ from the in-medium organization-specific data in a number of ways, including modality (e.g., voice versus text chat), context (e.g., contact center versus television), business vertical (e.g., travel versus finance), and ever type of communication (e.g., phone conversation versus voice mail). Nevertheless, in many cases, these various out-of-medium and generic data contain relevant material that can be carefully selected.

As such, some aspects of embodiments of the present invention relate to selecting relevant material from out-of-medium and generic data. In some embodiments, relevant material may be selected from the out-of-medium and generic data on a sentence level, thereby creating customized training data at a lower expense and higher level of automation, where the customized training data can be used to generate a language model for higher performance speech recognition in the target context. Aspects of embodiments of the present invention are also directed to the automatic update of the language model in accordance with the selection of relevant data from newly added sources of out-of-medium and generic material.

According to some embodiments of the present invention, out-of-medium data can be combined with a generic language model trained using in-medium data or combined with a customized language model to generate a customized language model. In addition, aspects of embodiments of the present invention are directed to updating a language model in accordance with additional or new out-of-medium material.

Figure 4A:
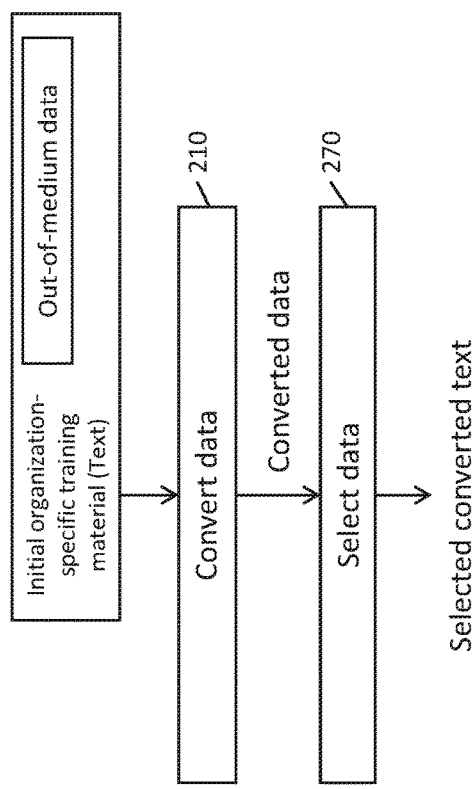
FIG. 4A is a flowchart of a method for extracting organization specific training data from a plurality of sources according to one embodiment of the present invention.

FIG. 4A is a flowchart of a method 200 for extracting organization-specific data from a plurality of sources according to one embodiment of the present invention. The method for extracting relevant data includes converting the data to in-medium compatible data (e.g., speech transcription compatible data) in operation 210, and selecting data from the cleaned data in operation 270.

Figure 4B:
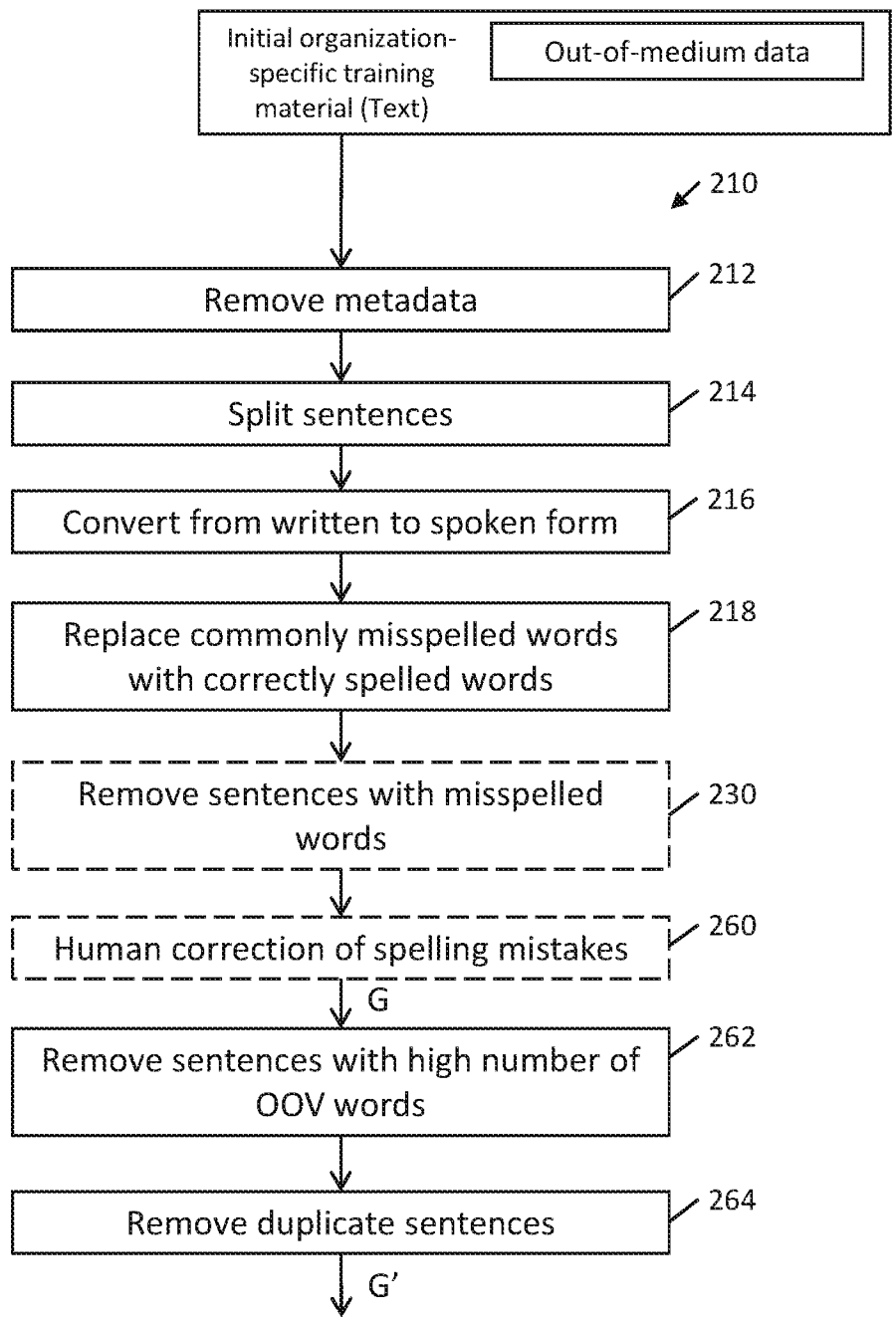
FIG. 4B is a flowchart of a method for cleaning out-of-medium data according to one embodiment of the present invention.

Operation 210 may include a plurality of operations to convert the out-of-medium data into data that are compatible with the in-medium data by making the data more closely resemble in-medium data. In some embodiments of the present invention, "speech transcription compatible data" refers to text data that contain phrases that are consistent with speech transcription text, such as types of phrases, spelling, abbreviation, pronunciation of acronyms, and the like, and where the distribution or frequency of these phrases in the data are consistent with their distribution in transcriptions of speech data. This process may be referred to as "cleaning" the data. FIG. 4B is a flowchart of a method for cleaning out-of-medium data according to one embodiment of the present invention. The cleaning of the data may include: filtering the words in accordance with the confidences in the words (e.g., the decoder 44B assigns confidences to the words in the transcripts, where the confidence represents the likelihood that the word was correctly decoded from audio to text) and extracting sentences according to part of speech sequences (e.g., removing sentences that are syntactically incorrect and keeping sentences that are syntactically correct, as identified by the part of speech sequences) so that later stages use legal sentences.

In operation 212, the LM training module 44AA removes metadata, such as removing headers (and footers) of the documents which are not part of the content of the conversation, interaction, or document. For example, in the case of the transcript of a text chat or in forum posts, usernames and timestamps may be automatically removed during the header and footer removal operation. As another example, in an email, the headers of the email, such as the "to" and "from" addresses, routing information, timestamps, and other data may be removed so that only the body (and, in some embodiments, the subject line) of the email is left for further processing.

In operation 214, the LM training module 44 performs sentence splitting on the data. In this operation, the LM training module 44AA splits the text of the out-of-medium data into sentences. This may done, for example, based on punctuation, time gaps, a sentence splitting algorithm such as the Sentence Splitter module of FreeLing (see, e.g., Lluis Padró and Evgeny Stanilovsky. FreeLing 3.0: Towards Wider Multilinguality. Proceedings of the Language Resources and Evaluation Conference (LREC 2012) ELRA. Istanbul, Turkey. May, 2012), and the like.

In some embodiments, in operation 216, the LM training module 44AA converts text that was originally written or typed into a spoken form. For example, symbols such as dates in a numeric format (e.g., 5/24/2016) or digits (e.g., 13) are converted into the words that are typically used when spoken (e.g., respectively, "May 24th, 2016" or "thirteen"). Similarly, abbreviations are converted to the spoken form, e.g. from "USD" to "dollars," from "IMO" to "in my opinion," and the like. In addition, in operation 218, common spelling mistakes that are known in advance may also be converted to the correct form (e.g., from "teh" to "the," from "u" to "you," "tho" to "although," and the like).

In some embodiments, the cleaning of the data in operation 210 also removing sentences that contain unrecognized words that are determined to be misspellings rather than legitimate new words that are not in the vocabulary V in operation 230. As such, aspects of embodiments of the present invention relate to further customizing the language model based on changes to the vocabulary V used in the context in which the language model operates by detecting "new" words and adding them to the language model. On the other hand, new words should be distinguished from common spelling mistakes that are not really new words. The erroneous addition of misspelled words to a language model can cause an undesirable effect in which the speech recognition system 44 outputs these misspelled words in a transcript. Therefore, aspects embodiments of the present invention relate to a method for distinguishing between new words and spelling mistakes, in which new words are added to the cleaned training data for the language model, and spelling mistakes are removed.

The LM training module 44AA may enlarge the dictionary or vocabulary V based on known words. These words may include words from the "program" created by human analysts of the analytics data. These words may also include words from existing spelling dictionaries such as Hunspell.

Figure 5:
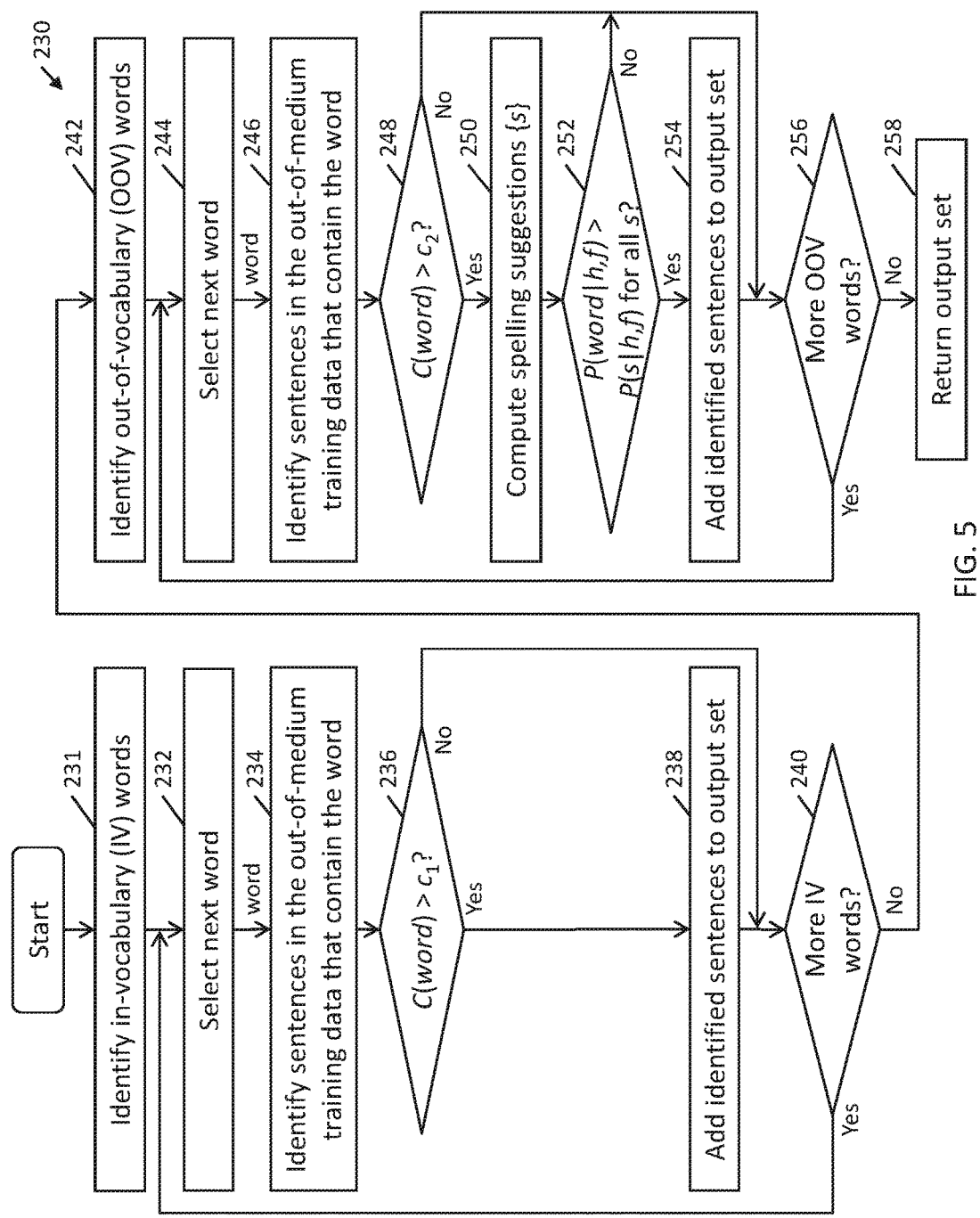
FIG. 5 is a flowchart of a method according to one embodiment of the present invention for filtering out sentences from the out-of-medium training data to remove sentences with spelling errors

FIG. 5 is a flowchart of a method 230 according to one embodiment of the present invention for filtering out sentences from the out-of-medium training data to remove sentences with spelling errors, while leaving sentences containing new words.

In operation 232, the LM training module 44AA selects a next word in the vocabulary V to process. In operation 234, it identifies sentences of the out-of-medium training data that contain the current word. In operation 236, the LM training module 44AA determines whether the count C of the word w (the number of times the word appears in the out-of-medium training material C(w)) is less than a threshold $c_1$. This parameter and this value may be respectively denoted herein as Min1gCount=$c_1$. If the count of the word is greater than the threshold $c_1$, then, in operation 238, the identified sentences containing the word are added to an output set of out-of-vocabulary training data. In either case, the flow proceeds to operation 240, in which the LM training module 44AA determines whether there are more words in the vocabulary V to process. If so, then the flow returns to operation 232 to select the next word. If not, then the flow proceeds to operation 242.

If there are no more in-vocabulary words to process, then in operation 242, the LM training module 44AA identifies a collection of out-of-vocabulary (OOV) words {w} appearing in the out-of-medium training data. In operation 244, the LM training module 44AA identifies a next OOV word w from the set of OOV words {w}, and computes a count C(w) of the OOV word w in operation 248. If the count C(w) does not exceed a second threshold $c_2$ (which may be referred to as Min2gCount), where $c_2 > c_1$ (e.g., $c_2 = 2c_1$), then the flow proceeds to operation 256. If the count of the word is higher than the threshold, then in operation 250, OOV word w is provided to a spell checking program (e.g., Hunspell), and the spell checking program generates a collection of one or more spelling suggestions {s} as to potential correct spellings of the OOV word w. In operation 252, the LM training module 44AA evaluates the inequality:

$$P(w|h) > P(s|h)$$

for every suggestion s in the collection {s}, where h is a history (e.g., words immediately preceding the OOV word w). The probabilities P(w|h) and P(s|h) can be computed from the counting the respective occurrences of word w and suggestion s preceded by history h in the out-of-medium training data (C(h,w) and C(h,s), respectively). In other words, the LM training module 44AA computes, for each s in {s}, whether it is more probable to find w or s given a preceding set of words h.

Because the count of the history C(h) is constant, the above inequality reduces to the condition:

$$C(w,h_1, \ldots ,h_n) > C(s,h_1, \ldots ,h_n)$$

In some embodiments of the present invention, the words following the OOV word w may also be used to compute the probabilities. Given that h represents a history (a sequence of words that come before the OOV word w in the sentence), f represents a sequence of future words (a sequence of words that come after the OOV word w in the sentence). Therefore, in a similar way to the above, the criteria would be:

$$P(w|h,f) > P(s|h,f)$$

While these probabilities could be calculated based on counting occurrences in the out-of-medium data, the computation can be simplified:

$$P(w \mid h, f) = \frac{P(w, f \mid h)}{P(f \mid h)}$$

The constant denominator can be ignored because the goal is to find a maximum ("argmaxing") on w and the collection of suggestions {s}, so it is sufficient to compute P(w,f|h) as:

$$P(w, f \mid h) = \frac{C(h, w, f)}{C(h)}$$

In other words, the LM training module 44AA can compute the probability P(w,f|h) (the probability of encountering word w followed by future words f, given previous words h leading up to word w) by counting the number of times the sequence (h,w,f) appears in the out-of-medium training data and by dividing by the total number of times h appears in the out-of-medium training data.

If the inequality is satisfied for all suggestions s, then the LM training module 44AA considers the OOV word w to likely be a new word rather than a misspelling. In other words, if this OOV word appears surrounded by a history and future words more often than any of the suggested corrected spellings, then it is considered likely to be a new word, and the identified sentences are added to the output set in operation 254. In addition, the OOV word may be added to the lexicon, or added to a lexicon of new words. However, if the OOV word fails either of the inequalities, then it is considered to be a misspelled word and the flow proceeds to operation 256.

In operation 256, the LM training module 44AA determines whether there are more words in the set of OOV words. If so, then the flow returns to operation 244, in which a next OOV word is selected. If there are no more words, then the process of removing sentences that contain spelling mistakes rather than new out-of-vocabulary words is complete, and the process can continue with further cleaning in operation 210.

In some embodiments, some limited human involvement can be included in operation 260 to perform manual spelling corrections for some words.

The set of sentences remaining in the cleaned out-of-medium training data after the spelling corrections, but before the next operation below, will be referred to as a set of sentences G.

In some embodiments, in operation 210, the LM training module 44AA removes sentences in which a large number of the words are out-of-vocabulary (OOV). In one embodiment, if more than a threshold number of words in a sentence are not in a lexicon (e.g., if more than two of the words in the sentence are not in the lexicon), then the entire sentence is excluded from further analysis. This cleaning operation may be used to remove sentences that are not relevant because, for example, they are written in a different language (e.g., a sentence written in Spanish where the target context is English).

In operation 210, the LM training module 44AA may also remove duplicate sentences.

The set of sentences remaining in the cleaned out-of-medium training data after removing the duplicate sentences will be referred to as a set G' of unique sentences.

In operation 270, the LM training module 44AA selects data from the cleaned out-of-medium training material selected in operation 210.

Figure 6A:
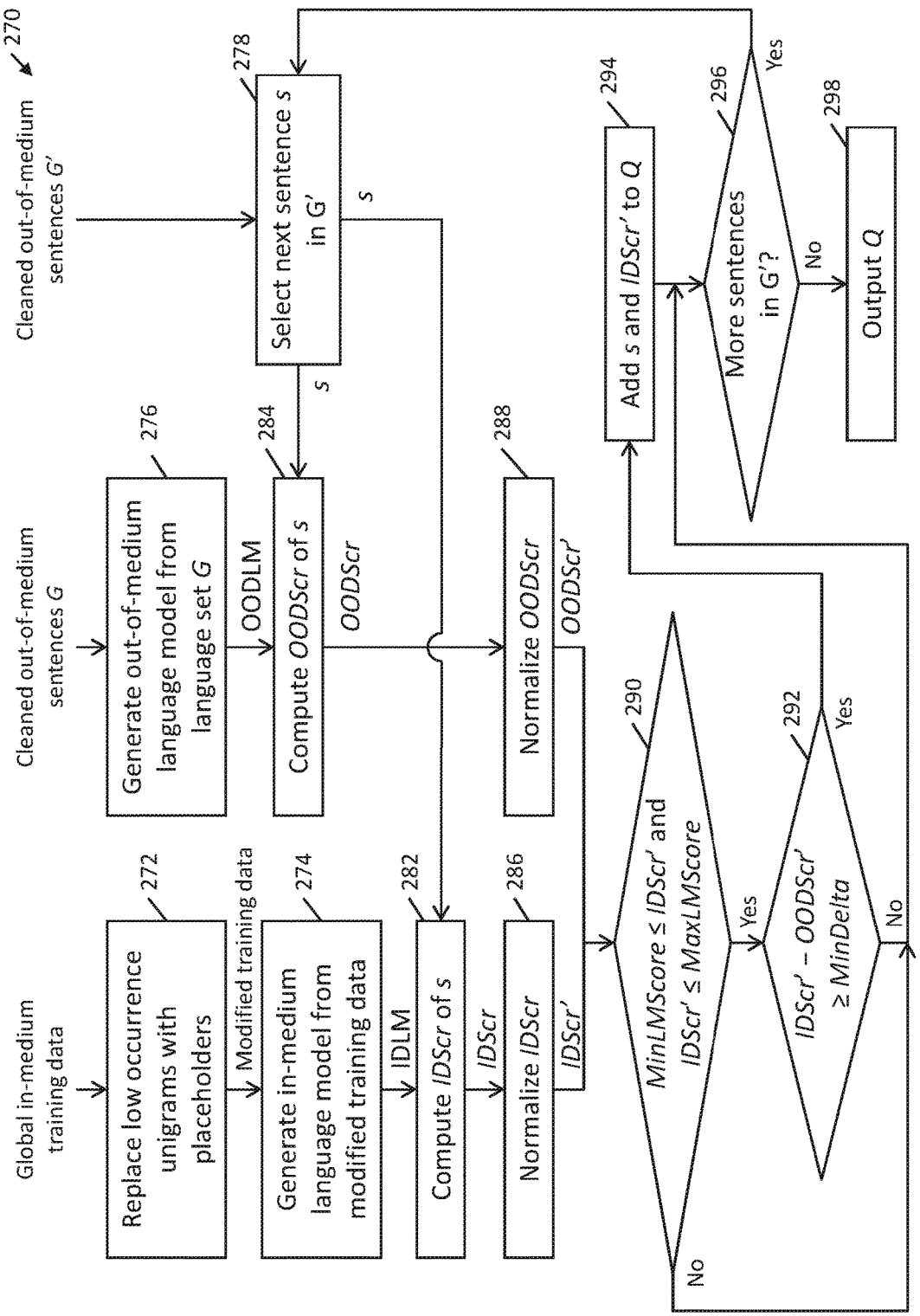
FIG. 6A is a flowchart of a method for selecting data from the out-of-medium training material using an in-medium/out-of-medium cross entropy difference technique according to one embodiment of the present invention.

According to one embodiment of the present invention, the LM training module 44AA selects data from the out-of-medium training material using an in-medium (or in-domain) out-of-medium (or out-of-domain) cross entropy difference technique. In this embodiment, the two sets of sentences G and G' are supplied as input along with the global in-medium training data, and parameters MinLMScore, MaxLMScore, and MinDelta. FIG. 6A is a flowchart of a method 270 for selecting data from the out-of-medium training material using an in-medium/out-of-medium cross entropy difference technique according to one embodiment of the present invention.

In operation 272, the LM training module 44AA replaces low occurrence unigrams in the global in-medium training material with a placeholder symbol (e.g., <UNK>), and, in operation 274, computes an in-medium language model IDLM from the resulting global in-medium training material.

In operation 276, the LM training module 44AA generates an out-of-medium language model OODLM using the set of cleaned out-of-domain sentences G.

The LM training module 44AA iterates over the sentences s in G' and determines whether to add the sentence s to the result set Q. In operation 278, the LM training module 44AA selects a next sentence s from G' to evaluate (e.g., randomly selects a next sentence s). In operation 282, the LM training module 44AA supplies the sentence s to the in-medium language model IDLM to compute an in-medium score IDScr, and, in operation 284, supplies the sentence s to the out-of-medium language model to compute an out-of-medium score OODScr. The LM training module then normalizes the scores by the length of the sentence to produce a normalized IDScr' and a normalized OODScr' in operation 286 and 288, respectively.

In operation 290, the LM training module 44AA determines whether the IDScr' is between MinLMScore and MaxLMScore (MinLMScore IDScr' MaxLMScore) and, in operation 292, whether IDScr'−OODScr' MinDelta. If either of the conditions fails, then the flow proceeds to operation 296. However, if both conditions of 290 and 292 are satisfied, then in operation 294, the LM training module 44AA adds s to a result set Q (with the original words of s, rather than with unigrams replaced with <UNK>), along with its score.

In operation 296, the LM training module 44AA determines whether there are more sentences in G'. If so, then the process returns to operation 278 to select the next sentence s from G'. If not, then the process proceeds to output the set Q in operation 298.

Figure 6B:
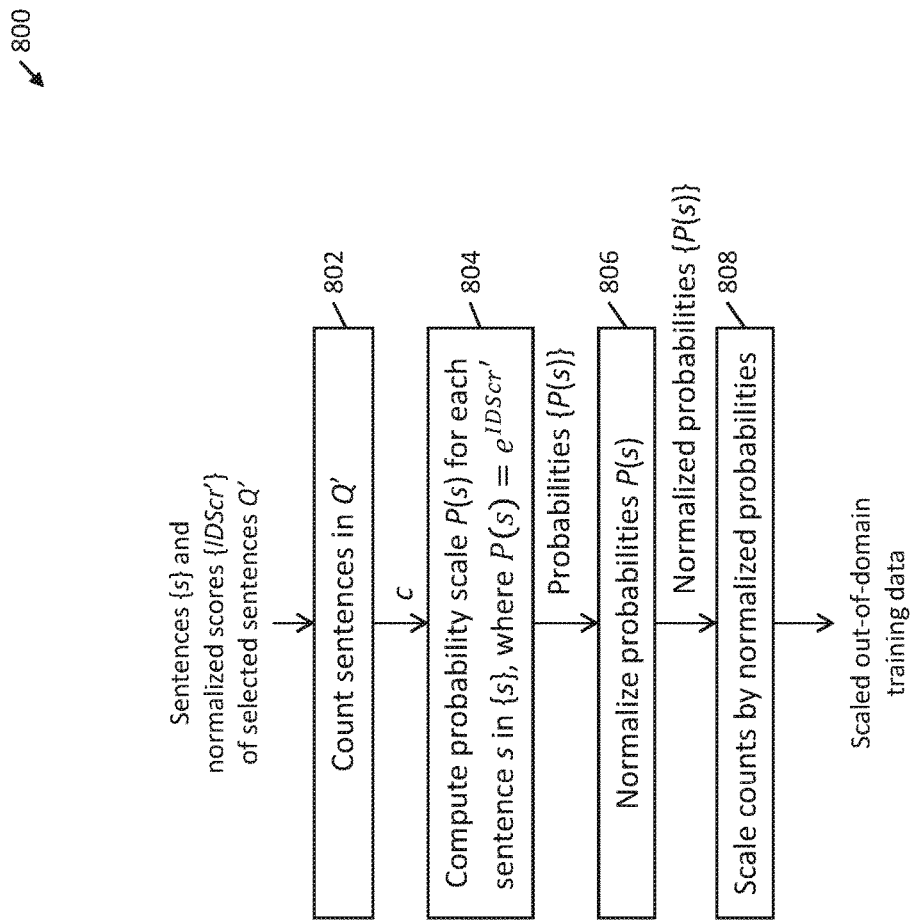
FIG. 6B is a flowchart of a method for computing the weights of out-of-medium sentences according to one embodiment of the present invention.

FIG. 6B is a flowchart of a method 800 for computing the weights of out-of-medium sentences according to one embodiment of the present invention. In operation 600, the LM training module 44AA counts the number of sentences in G' as a value c. In operation 804, the LM training module 44AA iterates over the sentences s to converts the normalized score IDScr' of each sentence s to a probability scale, where the probability of a sentence P(s) is given by:

$$P(s) = e^{IDScr'}$$

In operation 806, the LM training module 44AA normalizes the computed probabilities P so that they sum to 1. For example, the LM training module 44AA may compute a value k such that:

$$\sum_{s}^{G'} P(s) = k$$

and may then normalize the probabilities P(s) by scaling each probability P(s) by 1/k.

In operation 808, the LM training module 44AA sentences s in Q to set the count Count(s) of each sentence s in the resulting training data to be:

$$\text{Count}(s) = \text{Max}(1, \text{floor}(P(s)*c))$$

As such, the out-of-medium data can be selected and scaled for use with the global in-medium training data to produce scaled out-of-domain training data for training a customized language model.

Figure 7A:
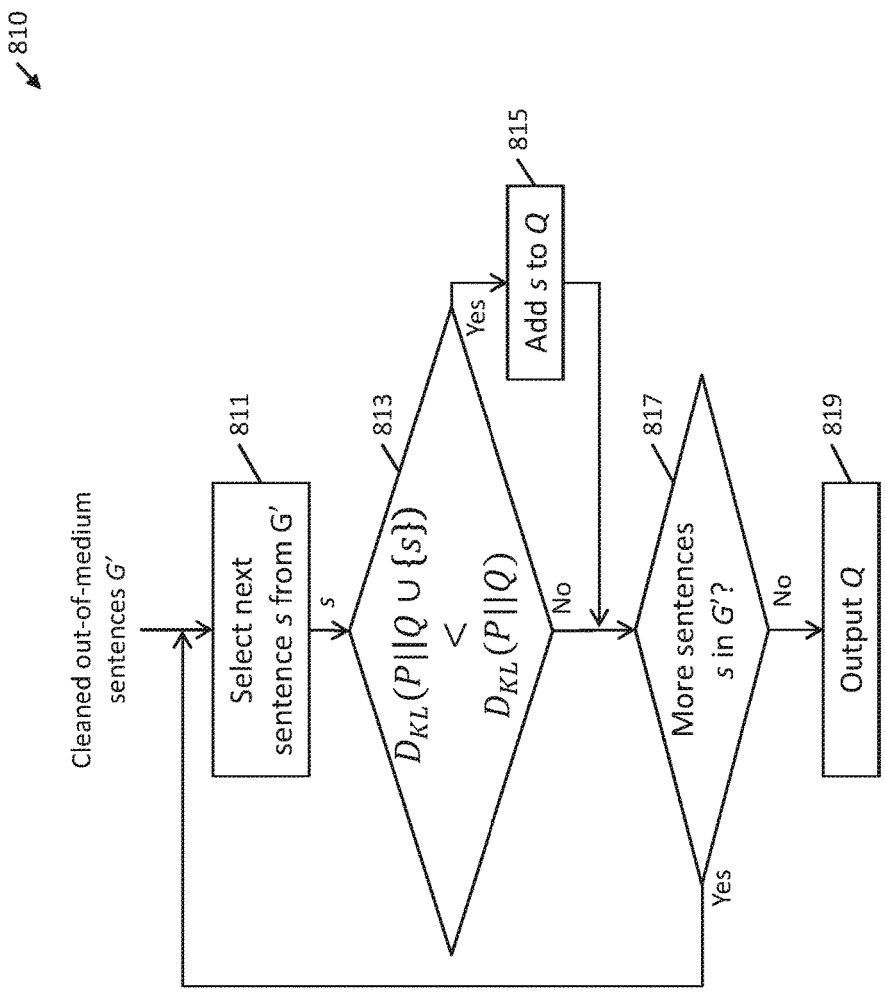
FIG. 7A is a flowchart of a method for selecting data from out-of-medium training data using cross entropy minimization according to one embodiment of the present invention.

According to another embodiment of the present invention, the LM training module 44AA selects data for the statistical language model (SLM) using a cross entropy minimization technique. FIG. 7A is a flowchart of a method 810 for selecting data from out-of-medium training data using cross entropy minimization according to one embodiment of the present invention. Generally, the selection method in embodiments of the present invention selects sentences that, in some sense, do not cause large changes to the in-domain language model distribution. More specifically, in some embodiments of the present invention, the LM training module 44AA only sentences that reduce the Kullback-Leibler (KL) divergence between the trained language model and the reference (global) language model.

According to one embodiment of the present invention, a reference training set P includes the global in-medium training data and selects a new set Q that includes the selected sentences s. In operation 811, the LM training module 44AA receives a set of cleaned out-of-medium sentences G'. For each new sentence s in the out-of-medium training data G', the LM training module 44AA adds the sentence s to Q in operation 815 if, in operation 813, the sentence s satisfies the condition:

$$D_{KL}(P\|Q\cup\{s\}) < D_{KL}(P\|Q)$$

where $$D_{KL}(P\|Q) = H(P,Q) - H(P)$$

where H(P,Q) is a cross-entropy between P and Q and H(P) is the entropy of P. In some embodiments, the sentences s are added from G' in random order. In operation 817, the LM training module determines if there are more sentences s in G' to be evaluated. If so, then in the flow returns to operation 811 to select the next sentence. If there are no more sentences, then in operation 819, the resulting set Q is output to be combined with the global in-domain training material.

However, calculating the Kullback-Leibler (KL) divergence $D_{KL}$ for each sentence s in operation 813 can be computationally expensive. As such, according to one embodiment of the present invention, a simplified calculation can be used to arrive at similar results. Because P corresponds to the global in-medium training data, which is constant through the process of evaluating the sentences s, minimizing $D_{KL}(P\|Q)$ is equivalent to minimizing H(P,Q). This, in turn, is equivalent to minimizing the perplexity PP(P,Q) of Q given a test P, where P is the empirical distribution in the set P (in other words, P(x)=n/m where n is the number of times that x appears in the test set P of size N. Therefore, the cross-entropy term of the empirical distribution can be expressed as:

$$H(P, Q) = -\frac{1}{N} \sum_{x_i \in P} \ln Q(x_i)$$

by ignoring the constant term $$-\frac{1}{N},$$

minimizing H(P,Q) is equivalent to maximizing:

$$\hat{H} = \sum_{x_i \in P} \ln Q(x_i)$$

By the chain rule:

$$\ln Q(x_i) = \ln Q(i) = \sum \ln\frac{tri}{bi} + \ln\frac{bi}{un} + \ln\frac{un}{M}$$

where M is the number of sentences in Q, un is the count of the sentence-starting leftmost unigram from $x_i$, in Q, bi is the count of the leftmost bigram from $x_i$, in Q, and tri is the count of the current trigram (in the summary) from $x_i$, in Q. When M is large, ln(M)≈ln(M+1), and therefore, in some embodiments, substantially the same results can be obtained without updating the number M for every new sentence s. For example, the number M can be updated for every time the size of Q increases by approximately M (e.g., each time Q doubles in size, as approximated by the number of sentences s that are considered).

Substituting the expression for ln $Q(x_i)$ into the above sum results in:

$$\hat{H} = \sum_{u \in tri} C(u)\ln\frac{u}{bi(u)} + \sum_{v \in bi} C(v)\ln\frac{v}{un(v)} + \sum_{w \in un} C(w)\ln\frac{w}{M}$$

where C is the count of the n-gram (e.g., trigram, bigram, or unigram) in the set.

Given the above simplification of the evaluation of the cross-entropy $\hat{H}$ of adding a sentence $x_i$ to the resulting set of sentences Q, in different embodiments of the present invention, the sentences are modeled in different ways for evaluation.

Figure 7B:
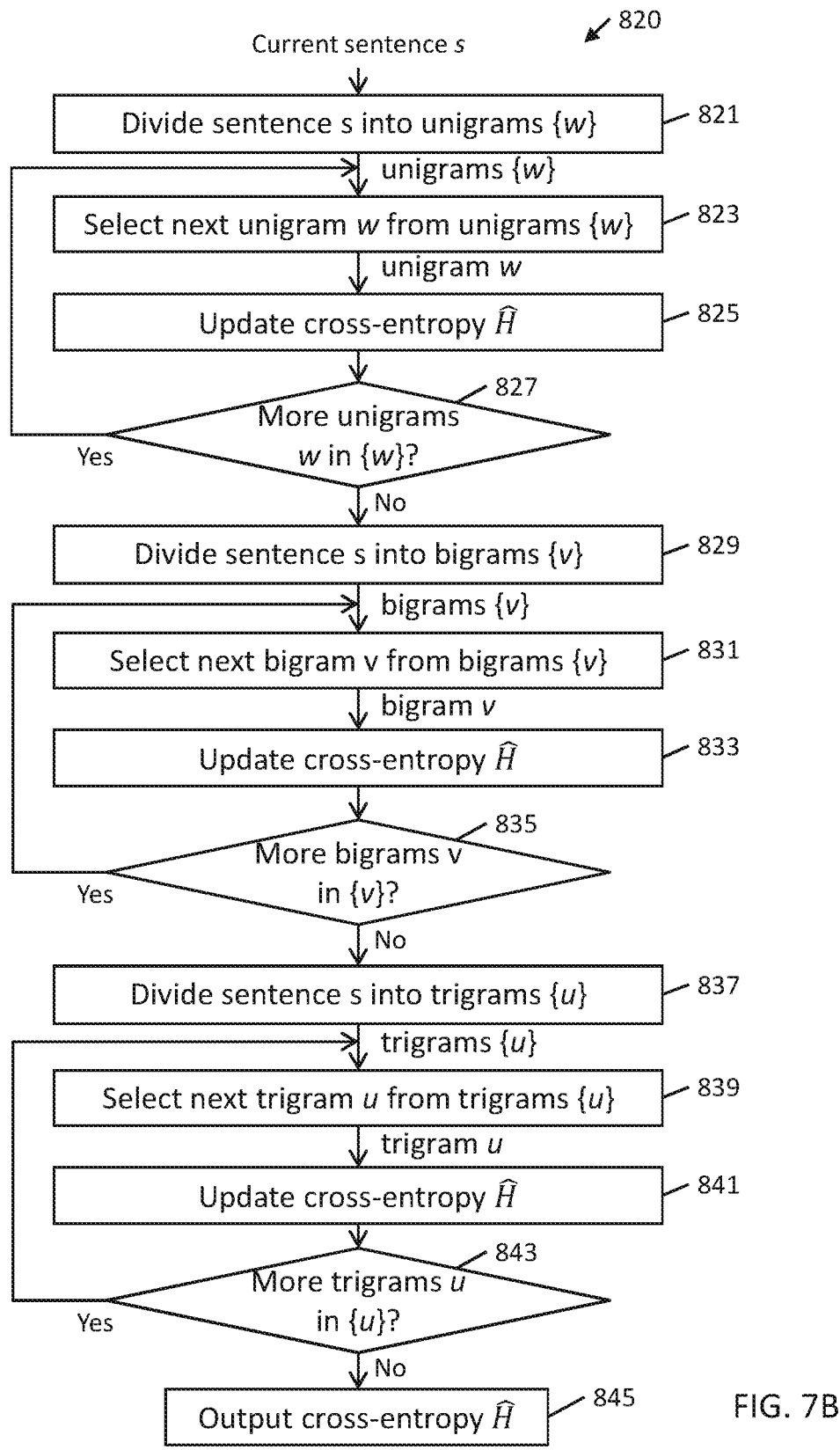
FIG. 7B is a flowchart of a method for evaluating a sentence from out-of-medium training data using cross entropy minimization according to one embodiment of the present invention.

In one embodiment of the present invention, a sentence s is modeled as an n-gram. FIG. 7B is a flowchart of a method 820 for evaluating a sentence s modeled as an n-gram to update the numerators in the above expression for $\hat{H}$ (e.g., the numerators of $$C(u)\ln\frac{u}{bi(u)} \text{ or } C(v)\ln\frac{v}{un(v)} \text{ or } C(w)\ln\frac{w}{M})$$

in accordance with one embodiment of the present invention. In operation 821, the LM training module 44AA divides the sentence s into a plurality of unigrams $\{w\}$, to update the relevant bins (each bin referring to an element in the summary $\hat{H}$), for each unigram w in s (so that only the bins corresponding to unigrams w from s are updated, not all elements in the summary $\hat{H}$). In operation 823, the LM training module 44AA selects a next unigram w from the plurality of unigrams $\{w\}$. In operation 825, the cross-entropy $\hat{H}$ is updated:

$$\hat{H} \leftarrow \hat{H} - C(w)\ln\frac{w}{N} + C(w)\ln\frac{w+1}{M'} = \hat{H} + C(w)\left[\ln\frac{w+1}{w} + \ln\frac{M}{M+1}\right]$$

where M'=M+1. When M is large, M'≈M, so ln(M/(M+1)) ≈0, and therefore the update of cross-entropy $\hat{H}$ can be expressed as:

$$\hat{H} += C(w)\ln\frac{w+1}{w}$$

where "+=" refers to "augmented assignment" (x+=a is defined as x←x+a).

In operation 829, the LM training module 44AA divides the sentence s into a plurality of bigrams $\{v\}$ (two consecutive words) and selects the next bigram v in operation 831. For the current bigram v, in operation 831, the LM training module 44AA updates the entropy $\hat{H}$ as follows:

$$\hat{H} \leftarrow \hat{H} - C(v)\ln\frac{v}{un(v)} + C(v)\ln\frac{v+1}{un'(v)}$$

where un'(v) is the new count of un(v) after the previous step. This is equivalent to:

$$\hat{H} += C(v)\left[\ln\frac{v+1}{v} + \ln\frac{un(v)}{un'(v)}\right]$$

In operation 835, the LM training module determines whether there are more bigrams v in the plurality of bigrams $\{v\}$. If so, then the process returns to operation 831, in which the next bigram v is selected.

Similarly, in operation 837, the LM training module 44AA divides the sentence s into a plurality of trigrams $\{u\}$ (three consecutive words) and selects a next trigram u in operation 839. In operation 841, the LM training module updates the entropy $\hat{H}$ based on the trigram $$\hat{H} += C(u)\left[\ln\frac{u+1}{u} + \ln\frac{bi(u)}{bi'(u)}\right]$$

where bi'(u) is the new count of bi(u) after the previous step.

In operation 843, the LM training module determines whether there are more trigrams u in the plurality of trigrams $\{u\}$ to process. If so, then the flow returns to operation 839 to select the next trigram u. If not, then the process is complete, and the computed cross entropy $\hat{H}$ of adding the current sentence s is returned.

Figure 7C:
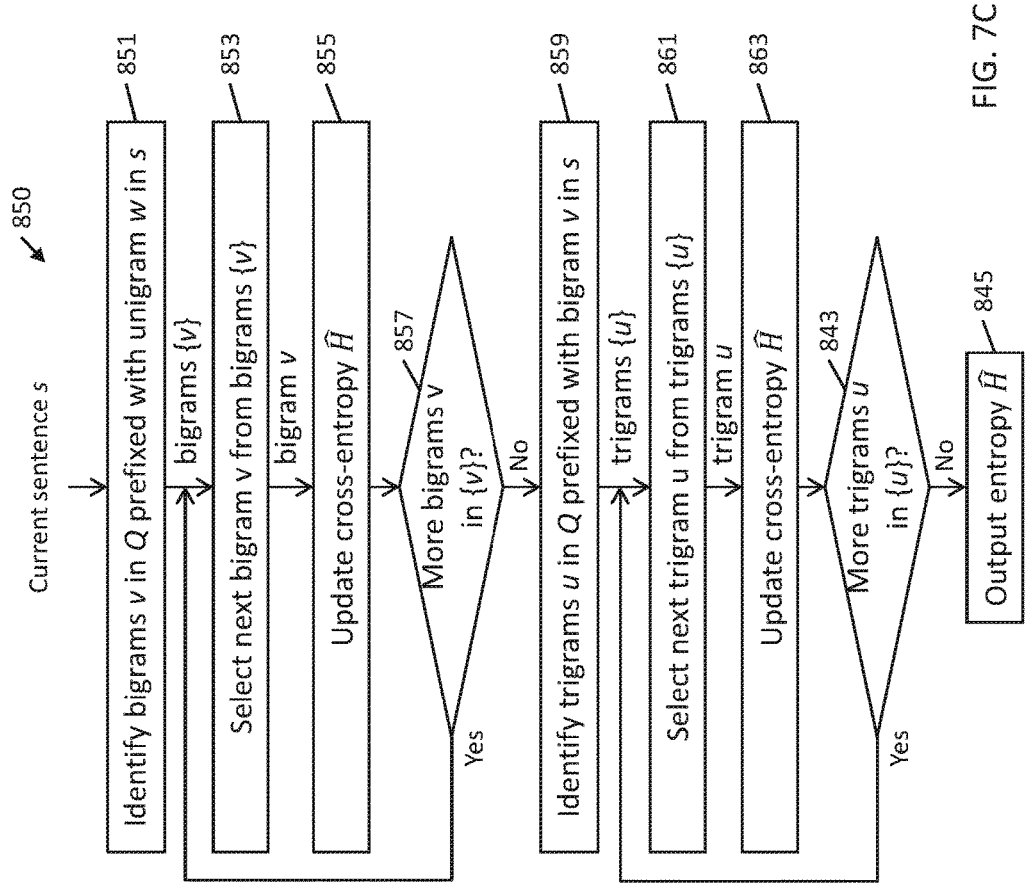
FIG. 7C is a flowchart illustrating a method for updating the denominator in accordance with one embodiment of the present invention.

In one embodiment, the LM training module 44AA updates the denominator. FIG. 7C is a flowchart illustrating a method 850 for updating the denominators in the above expression for $\hat{H}$ (e.g., the denominators of $$C(u)\ln\frac{u}{bi(u)} \text{ or } C(v)\ln\frac{v}{un(v)} \text{ or } C(w)\ln\frac{w}{M})$$

in accordance with one embodiment of the present invention. In operation 851, the LM training module 44AA identifies bigrams v in Q prefixed with unigram w in s ($\forall v \in Q$ prefixed with unigram w∈s). In operation 853' the LM training module 44AA selects one of the bigrams v from among the identified bigrams and, in operation 855, updates the entropy $\hat{H}$:

$$\hat{H} \leftarrow \hat{H} - C(v)\ln\frac{v}{un(v)} + C(v)\ln\frac{v}{un'(v)} =$$
$$\hat{H} + C(v)\ln\frac{un(v)}{un'(v)} = \hat{H} + C(v)\ln\frac{w}{w+1}$$

In operation 857, the LM training module 44AA determines whether there are more bigrams v in the plurality of bigrams $\{v\}$ to be processed. If so, then the process returns to operation 853 to select the next bigram v. If not, then the process continues to operation 859.

In operation 859, the LM training module 44AA identifies every trigram u in Q that is prefixed with bigram v (∀u ∈ Q prefixed with v ∈ Q) to generate trigrams $\{u\}$. In operation 861, the LM training module selects a next trigram u from $\{u\}$, and in operation 863, updates the entropy $\hat{H}$:

$$\hat{H} \leftarrow \hat{H} - C(u)\ln\frac{u}{bi(u)} + C(u)\ln\frac{u}{bi'(u)} = \hat{H} + C(u)\ln\frac{v}{v+1}$$

In operation 865, the LM training module 44AA determines whether there are more trigrams u in the plurality of trigrams $\{u\}$ to be processed. If so, then the process returns to operation 861 to select the next trigram u. If not, then the process is complete and the resulting entropy $\hat{H}$ is returned.

Regarding out-of-vocabulary words from P (unigrams w), in order to avoid calculating entropies of -∞, and in order to model low values for out-of-vocabulary words (that will increase $\hat{H}$ when they are added to the vocabulary to become in-vocabulary words), all low-occurrence unigrams are replaced with a common token in Q (e.g., "<UNK>"). In one embodiment of the present invention, unigrams w having a count less than a threshold level c are replaced with the token "<UNK>." In addition, when computing the entropy Ĥ, words (unigrams w) occurring less than c times are replaced with the token "<UNK>."

The unknown tokens may be periodically recomputed, but embodiments of the present invention do not necessarily require that these be recomputed for every sentence s that is added.

In addition, embodiments of the present invention may apply a back-off model to avoid problems of out-of-vocabulary n-grams of higher order, such as bigrams and trigrams, that nullify the whole term. One example of a back-off model is described in Katz, Slava M. Estimation of Probabilities from Sparse Data for the Language Model Component of a Speech Recognizer. IEEE Trans. on Acoustics, Speech, and Signal Processing. ASSP-35, No. 3 (1987). In the case of a simple back-off where $P(c|ab) \approx P(c|b)$, the model is automatically maintained because the bigrams and trigrams are already represented. When the back-off model is more complex, such as in the model described in Katz, in some embodiments, the back-off model is not updated for every newly added sentence s in order to reduce computational overhead of maintaining the back-off model, as described in Sethy, Abhinav, Panayiotis G. Georgiou, Bhuvana Ramabhadran, and Shrikanth Narayanan. An Iterative Relative Entropy Minimization-Based Data Selection Approach for n-Gram Model Adaptation. IEEE Trans. on Acoustics, Speech, and Signal Processing. 17:1 (2009). Moreover, when determining whether to add a given sentence s from the out-of-domain training data to Q, the language model LM of Q does not need to perfectly accurately correspond to the details of the back-off model, discounting (e.g., reducing frequencies of n-grams in the language model, see Katz), and the number of sentences M in Q (as previously seen, for large M, $\ln(M) \approx \ln(M+1)$).

Figure 7D:
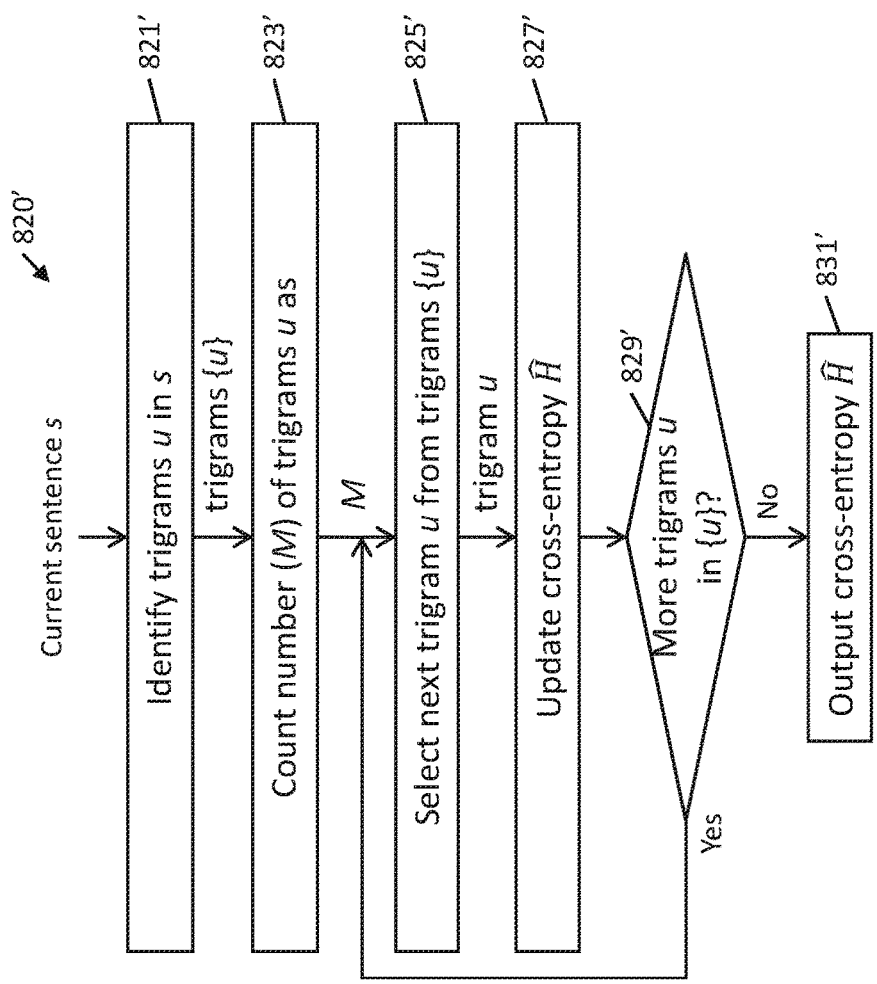
FIG. 7D is a flowchart of a method for evaluating a sentence from out-of-medium training data represented as bags-of-trigrams according to one embodiment of the present invention.

According to another embodiment of the present invention, the sentences can be represented as a bag-of-trigrams {u, cnt}. FIG. 7D is a flowchart of a method 820' for evaluating a sentence from out-of-medium training data represented as bags-of-trigrams according to one embodiment of the present invention. Given a sentence s from the out-of-domain training data, in operation 821', the LM training module 44AA divides the sentence s into a plurality of trigrams {u}. In operation 823', the LM training module 44AA counts the number of trigrams u in {u}, where the count may be referred to herein as M. In operation 825', the LM training module 44AA selects a next trigram u from the trigrams {u}, and in operation 827', the LM training module 44AA updates the entropy Ĥ according to:

$$\hat{H} \leftarrow \hat{H} + C(u)\left[\ln\frac{u+1}{u} + \ln\frac{M}{M+1}\right] \cong \hat{H} + C(u)\ln\frac{u+1}{u}$$

where M is the number of trigrams in Q.

In operation 829', the LM training module 44AA determines whether there are more trigrams u in the plurality of trigrams {u} to process. IF so, then the flow returns to operation 825', where a next trigram u is selected from the trigrams {u}. If not, then the computed cross-entropy Ĥ is output in operation 831'.

In addition, in some embodiments of the present invention, trigrams appearing less than a threshold c number of times are replaced with a token, e.g., "<UNK>."

In both the n-gram model and the bag-of-trigrams model, the set Q is initialized with data from P (e.g., a small set of sentences selected randomly from P) so that the above approximation of $\ln(M) \approx \ln(M+1)$ will hold. In addition, a re-computation of the maximum likelihood estimates of the n-grams can be automatically triggered as the size of Q increases (e.g., each time Q doubles in size).

In operation 200, the LM training module 44AA may also combine all of the organization-specific training material (e.g., the "program," the out-of-medium material, and the in-medium speech recognition transcript data). The term "source document" may be used herein to refer to organization-specific data extracted from one of the data sources of organization-specific training data (e.g., the in-medium training material, the program, or the out-of-medium training material). For example, each email, chat session, or voice interaction will be considered a separate source document. For time-zero customization, each email, chat session, web page, forum interaction, and the like will be considered a separate source document. The program data may be considered as a separate document (e.g., the concatenation of all of the terms of interest to the organization). In some embodiments of the present invention, all of the organization-specific training material is concatenated into a single document.

Once the organization specific training data are extracted in operation 200, in some embodiments of the present invention, the LM training module 44AA combines the organization specific training data (e.g., the out-of-medium training data and, if available, in-medium training data) with the global training data. One way to introduce the organization-specific training material into the language model would be to merely concatenate the organization-specific training material onto the global training material. However, because the organization-specific training material is generally much smaller than the global training material (e.g., by multiple orders of magnitude such as thousands of entries in the customer training material versus millions of entries in the global training material), the organization-specific training material may have little to no impact on the resulting language model.

Another way to add the organization-specific training material would be to generate a separate language model using the organization-specific training material and to scale values from the global language model by a weight (e.g., a weight a, where $0 \le a \le 1$). In particular, the selected sentences are added with weights that fit the in-medium language model distribution such that likely sentences are added with higher weight than less likely sentences. To do so, the sentences are replicated in proportion to their corresponding in-medium language model scores.

In operation 300, the LM training module 44AA compares the global in-medium training material (e.g., transcripts of interactions from other contact centers) with the organization specific training data to compute a plurality of similarities. The global in-medium training material may include transcripts of voice interactions between agents of various contact centers and customers. These contact centers are generally contact centers of other organizations that may be in different business verticals. In one embodiment, each transcript in the global in-medium training material may be referred to as a separate document. In other embodiments, individual speaking turns (e.g., the full text from when one party starts speaking until another party begins speaking), paragraphs, or sentences may be referred to as separate documents.

As such, the similarities reflect the similarity between the words and phrases found in various portions of the global in-medium training material and the organization-specific training material.

According to one embodiment of the present invention, the similarity (or "relatedness") of the global in-medium training material is represented by a similarity matrix. In more detail, assuming that there are N global in-medium training documents labeled $\{doc_1, doc_2, \ldots, doc_N\}$ and that there are M source documents in the organization-specific training material, labeled $\{src_1, src_2, \ldots, src_M\}$, then the similarity matrix may be an M×N matrix, where each row of the matrix contains the relatedness between the source document src and each of the N global in-medium training documents doc. A portion of one example similarity matrix is shown below:

$$\begin{array}{c} \\ src_1 \\ src_2 \\ \vdots \\ \vdots \\ src_M \end{array} \begin{pmatrix} \overset{Doc\ 1}{0.5} & 0.22 & \ldots & \overset{Doc\ N}{0.47} \\ \vdots & \vdots & & \vdots \\ \vdots & \vdots & & \vdots \\ 0.1 & 0.9 & \ldots & 0.7 \\ 0.27 & 0.4 & \ldots & 0.18 \end{pmatrix}_{M \times N}$$

The relatedness can be defined by a similarity or distance metric sim(i,j), which represents a similarity between an i-th source document $src_i$ and a j-th in-domain training document $doc_j$. In one embodiment of the present invention, the similarity of two documents is computed using the term frequency-inverse document frequency (tf-idf) metric, as described in, for example, Manning, C. D.; Raghavan, P.; Schutze, H. "*Scoring, term weighting, and the vector space model*". *Introduction to Information Retrieval* (2008) and Ramos, J. "Using tf-idf to determine word relevance in document queries" First International Conference on Machine Learning (2003), the entire disclosures of which are hereby incorporated by reference. Each document may be represented using a tf-idf vector, and the similarity between two documents (e.g., a source document src and a global training material document doc) can be obtained by computing the cosine distance between the vectors of the respective documents. In some embodiments, the Apache Lucene software can be used to compute the similarity between documents in this way.

In operation 400, the LM training module 44AA sorts the global in-medium training data by similarity to the organization specific training data, where the sorting assists in the partition of the training data in operation 500. In one embodiment, the LM training module 44AA uses the similarity matrix computed in operation 300 to compute a vector ($ovs_{1 \times N}$), which represents the overall relatedness or similarity of each of the global in-medium documents doc to the full set of M organization source documents src by computing an average (e.g., mean) score of each column of the matrix (e.g., by averaging the columns in the matrix):

$$ovs_{1 \times N} = \left( \frac{1}{M} \sum_{i=1}^{M} sim(i, 1) \ldots \ldots \frac{1}{M} \sum_{i=1}^{M} sim(i, N) \right)$$

Each element in the vector ovs represents the similarity of a document of the global in-medium documents to the set of organization-specific data.

In some embodiments of the present invention, a single computation can be performed to arrive at the vector ovs. In more detail, all of the source documents src can be concatenated into a single company-specific source document $SRC_{ALL} = src_1 + src_2 + \ldots + src_M$, where the "+" operator stands for concatenation. In this embodiment, in operation 400, the LM training module 44AA computes the similarity between each of the global in-medium documents and the combined single company-specific source document $SRC_{ALL}$:

$$ovs_{1 \times N} = (sim(SRC_{ALL}, 1) sim(SRC_{ALL}, 2) \ldots sim(SRC_{ALL}, N))$$

The LM training module 44AA then sorts the overall similarity vector ovs by similarity to the organization-specific data, as shown, for example, in Table 1 below:

TABLE 1

| $Doc_j$ | Similarity |
|---|---|
| $Doc_{1355}$ | 0.997 |
| $Doc_{1420}$ | 0.94 |
| ... | ... |
| $Doc_{2750}$ | 0.0087 |
| $Doc_{7504}$ | 0.001 |

In operation 500, the LM training module 44AA partitions the sorted global in-medium documents can be divided into P partitions, according to their similarity to the organization-specific data. In one embodiment, the number of partitions P is selected empirically based on a test set of the data. In another embodiment, a silhouette score is used to set the number of partitions, where the average silhouette of a data instance is a measure of how closely it is matched to data within its cluster and how loosely it is matched to data of the neighboring clusters (see, e.g., R. Lleti; M. C. Ortiz; L. A. Sarabia; M. S. Sanchez (2004). "*Selecting Variables for k-Means Cluster Analysis by Using a Genetic Algorithm that Optimises the Silhouettes*". *Analytica Chimica Acta.* 515: 87-100). According to one embodiment, the K-means technique is used to partition the data into the P partitions accordance with similarity, but embodiments of the present invention are not limited thereto. For example, in other embodiments of the present invention, a fixed set of one or more threshold similarities are used to partition the data (for example, documents having similarity greater than a threshold value, e.g., 0.95 may be in a first partition, and documents having similarity greater than 0.90 and less than or equal to 0.95 may be assigned to the second partition). In some situations, the partitions are the same size. In other situations, the partitions are not the same size.

Therefore, the first partition will contain the global in-medium documents that are most similar to the organization specific training data, and the P-th partition will contain the least similar documents, as shown, for example, in Table 2:

TABLE 2

| Partition | $Doc_j$ | Similarity |
|---|---|---|
| 1 | $Doc_{1355}$ | 0.997 |
|   | $Doc_{1420}$ | 0.94 |
|   | ... | ... |
| 2 | ... | ... |
|   | ... | ... |
| ... | ... | ... |
| P | $Doc_{7502}$ | 0.0088 |
|   | $Doc_{2750}$ | 0.0087 |
|   | $Doc_{7504}$ | 0.001 |

In operation 600, the LM training module 44AA weights the partitions in accordance with their similarities. The LM training module 44AA assigns each of the P partitions a corresponding desired weight $w_d$, so that the first partition has the highest desired weight $w_{d1}$, and the last partition has the lowest weight. In one embodiment of the present invention, the weights decrease exponentially:

$$weight_i = \frac{weight_1}{\alpha^{i-1}}$$

For example, as shown in Table 3 using an exponentially decreasing weight:

TABLE 3

| Partition | Desired weight $w_d$ | Example: $weight_1 = 1$ $\alpha = 2$; $P = 4$ |
|---|---|---|
| 1 | $w_{d1}$ | 1 |
| 2 | $w_{d2} = \frac{w_{d1}}{\alpha^{2-1}} = \frac{w_{d1}}{\alpha^1}$ | ½ |
| 3 | $w_{d3} = \frac{w_{d1}}{\alpha^{3-1}} = \frac{w_{d1}}{\alpha^2}$ | ¼ |
| 4 | $w_{d4} = \frac{w_{d1}}{\alpha^{4-1}} = \frac{w_{d1}}{\alpha^3}$ | ⅛ |

Figure 8:
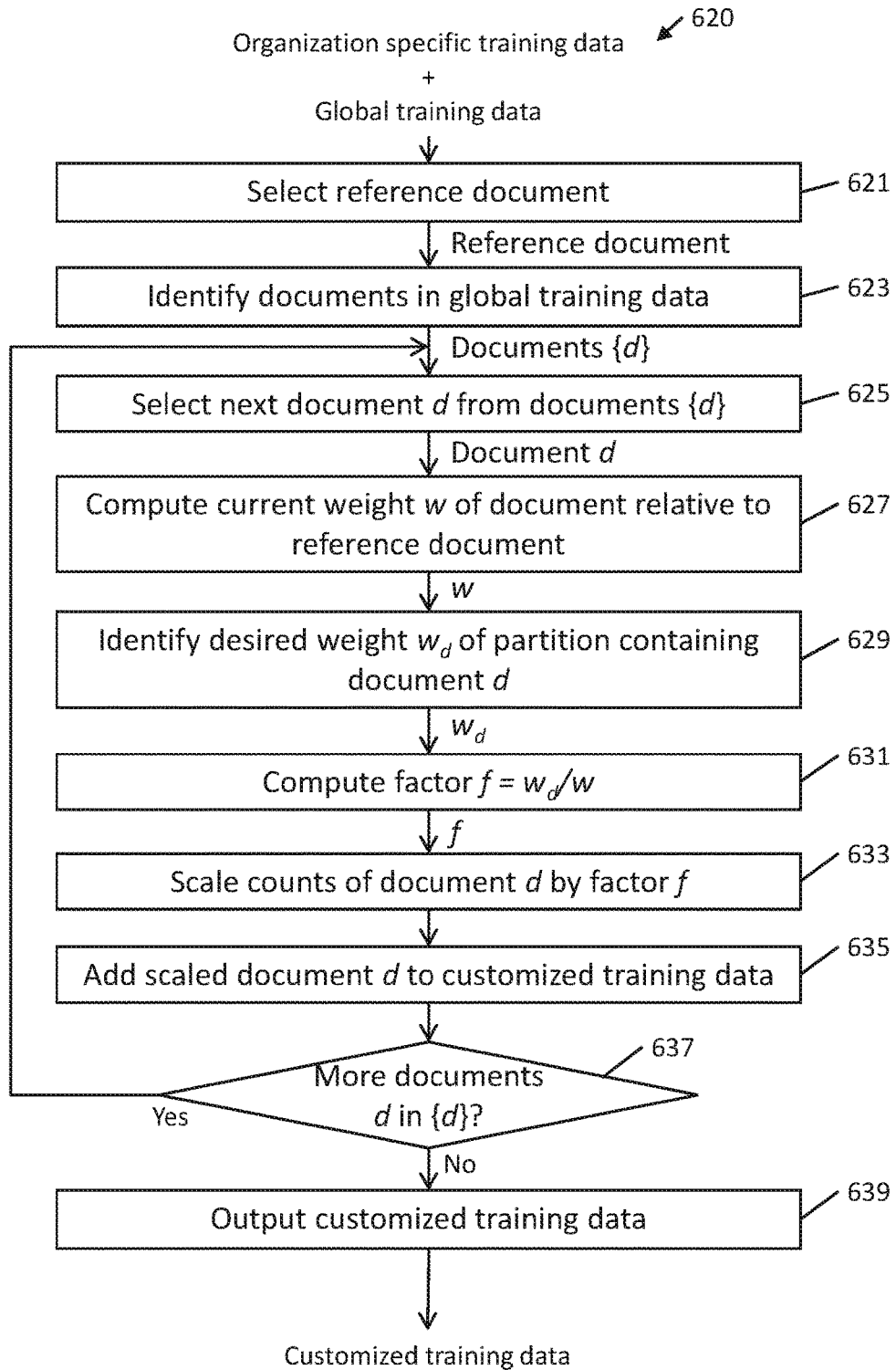
FIG. 8 is a flowchart of a method according to one embodiment of the present invention for combining different training data in accordance to the relevance of the training data.

FIG. 8 is a flowchart of a method according to one embodiment of the present invention for combining different training data in accordance to the relevance of the training data based on the desired weights. In order for the training data to reflect the relevance of the various partitions P and the actual quantity of data in each of the partitions P, in one embodiment of the present invention, the data in the partition are scaled based weights, as described in more detail below.

Table 4, below, shows a simple example with two corpora (e.g., documents):

TABLE 4

| n-gram | Corpus1 n-gram count | Corpus 2 n-gram count |
|---|---|---|
| A | 17 | 0 |
| a b | 19 | 0 |
| c d e | 0 | 34 |
| ... | ... | ... |
| y z | 8 | 5 |
| Total | 44 | 39 |

In the above example of Table 4, corpus 1 has a total count of 44 and corpus 2 has a total count of 39. (In a more typical real-world case, the global training material may have a total count in the millions, and the organization-specific training material may have a count in the thousands).

During the interpolation, to bring the weight of corpus 2 closer to a desired weight $w_d$ relative to corpus 1, the counts of the n-grams of corpus 2 can be scaled by a factor f to the desired weight $w_d$. The current weight w of corpus 2 is:

$$w = \frac{\text{corpus 2 count}}{\text{corpus 1 count}}$$

then if every count in Corpus 2 is multiplied by a factor f where:

$$f = \frac{w_d}{w}$$

then a different set of counts is produced for Corpus 2 where Corpus 2 has the desired weight $w_d$ relative to Corpus 1. In the above example of Table 4:

$$w_2 = \frac{\text{corpus 2 count}}{\text{corpus 1 count}} = \frac{39}{44}$$

Assuming, for example, that the desired weight $w_{d2}$ of corpus 2 is ½, then the factor $f_2$ for corpus 2 is:

$$f_2 = \frac{w_{d2}}{w_2} = \frac{1/2}{39/44} = \frac{44}{39 \times 2} = \frac{44}{78}$$

Generally, the size of the organization specific training data is smaller than the size of the global training data (e.g., thousands of sentences versus millions of sentences). In addition, the desired weight $w_d$ for each of the partitions P of the global training data is generally smaller than the weight of the organization specific training data.

As such, each of the documents in the P partitions can be considered to be a different corpus, where each of the P partitions has a corresponding desired weight ($w_{d1}, \ldots w_{dP}$).

As shown in FIG. 8, in one embodiment of the present invention, the LM training module 44AA interpolates the various documents of the global in-medium training data with the organization specific training data by scaling 620 the counts of the n-grams in the documents. In operation 621, the LM training module 44AA selects a reference document to scale the counts to. This reference document may be, for example, the aggregated document of the organization specific training data, or may be a typical document of the organization specific training data, or may be an arbitrary or representative document of the first partition. In operation 623, the LM training module 44AA identifies the set of documents {d} to be scaled in the training data. In operation 625, the LM training module 44AA selects a document d from the set of documents {d}, and identifies the desired weight $w_d$ of the document d based on which partition includes the document d. In operation 627, the LM training module 44AA computes a current weight w for the document by dividing the total count of the document d divided by the total count of the reference document, in operation 629, identifies the desired weight $w_d$ of the partition containing the document d, and, in operation 631, calculates the factor f for the document d based on the calculated current weight w and the desired weight $w_d$ of the partition that includes the document d. In operation 633, the LM training module 44AA scales the counts of the n-grams of document d by the factor f and, in operation 635, adds the scaled data to an output customized data set. In operation 637, the LM training module 44AA determines whether there are more documents d to process in the set of documents {d}. If so, then the flow returns to operation 625 to select a next document d. If not, then, in operation 639, the LM training module 44AA outputs the customized training data to train a language model.

As such, the counts of n-grams in each of the documents doc can be scaled in accordance with the corresponding factor f for the document d to select customized data for training the language model. (In the example of Table 3 above, the weights of each partition correspond to their desired weights $w_d$ in the final language model.)

In operation 700, the LM training module 44AA trains a language model based on the customized training data, which includes the weighted global training material as well as the organization-specific training material. Standard algorithms for computing a language model can proceed as usual using, for example, an appropriate discounting method and an appropriate back-off method.

The LM training module 44AA outputs the customized language model, which has been customized in accordance with organization-specific training material. The LM training module 44AA can supply the language model generated in operation 700 to the decoder module 44B, which uses the language model to convert input audio into text output (speech recognition output or LVCSR output). When using the customized language model, the decoder 44B of the speech recognition module 44 may be able to decode the input audio from the organization's voice interactions with higher accuracy because the language model is customized based on the organization-specific data.

The speech recognition output generated by the decoder 44B can be made a part of the on-going organization-specific training material. In more detail, the LM training module 44AA can use the speech recognition output generated by the decoder as additional organization-specific data that can be used to calculate the weights applied to the partitions of the global in-medium training data, and that can also be used as part of the data supplied to the language model along with the global in-medium training data.

In some embodiments of the present invention, in order to keep the language model up-to-date with phrases and events encountered by the organization, the process of generating a new language model based on the new data (e.g., from the speech recognition output of the decoder 44B) can be repeated at intervals (e.g., for every 50 hours of speech recognition output results). This "online" customization can be used to maintain a customized language model that is directed to the topics of interest and the current trends of phrases spoken in interactions of the target organization.

Computing Devices

As described herein, various applications and aspects of the present invention may be implemented in software, firmware, hardware, and combinations thereof. When implemented in software, the software may operate on a general purpose computing device such as a server, a desktop computer, a tablet computer, a smartphone, personal digital assistant, or an embedded system such as a computer system embedded in a device to create an internet-of-things (IoT) device. Such a general purpose computer includes a general purpose processor and memory.

Each of the various servers, controllers, switches, gateways, engines, and/or modules (collectively referred to as servers) in the afore-described figures may be a process or thread, running on one or more processors, in one or more computing devices 1500 (e.g., FIG. 9A, FIG. 9B), executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that a computing device may be implemented via firmware (e.g., an application-specific integrated circuit), hardware, or a combination of software, firmware, and hardware. A person of skill in the art should also recognize that the functionality of various computing devices may be combined or integrated into a single computing device, or the functionality of a particular computing device may be distributed across one or more other computing devices without departing from the scope of the exemplary embodiments of the present invention. A server may be a software module, which may also simply be referred to as a module. The set of modules in the contact center may include servers, and other modules.

The various servers may be located on a computing device on-site at the same physical location as the agents of the contact center or may be located off-site (or in the cloud) in a geographically different location, e.g., in a remote data center, connected to the contact center via a network such as the Internet. In addition, some of the servers may be located in a computing device on-site at the contact center while others may be located in a computing device off-site, or servers providing redundant functionality may be provided both via on-site and off-site computing devices to provide greater fault tolerance. In some embodiments of the present invention, functionality provided by servers located on computing devices off-site may be accessed and provided over a virtual private network (VPN) as if such servers were on-site, or the functionality may be provided using a software as a service (SaaS) to provide functionality over the internet using various protocols, such as by exchanging data using encoded in extensible markup language (XML) or JavaScript Object notation (JSON).

Figure 9A:
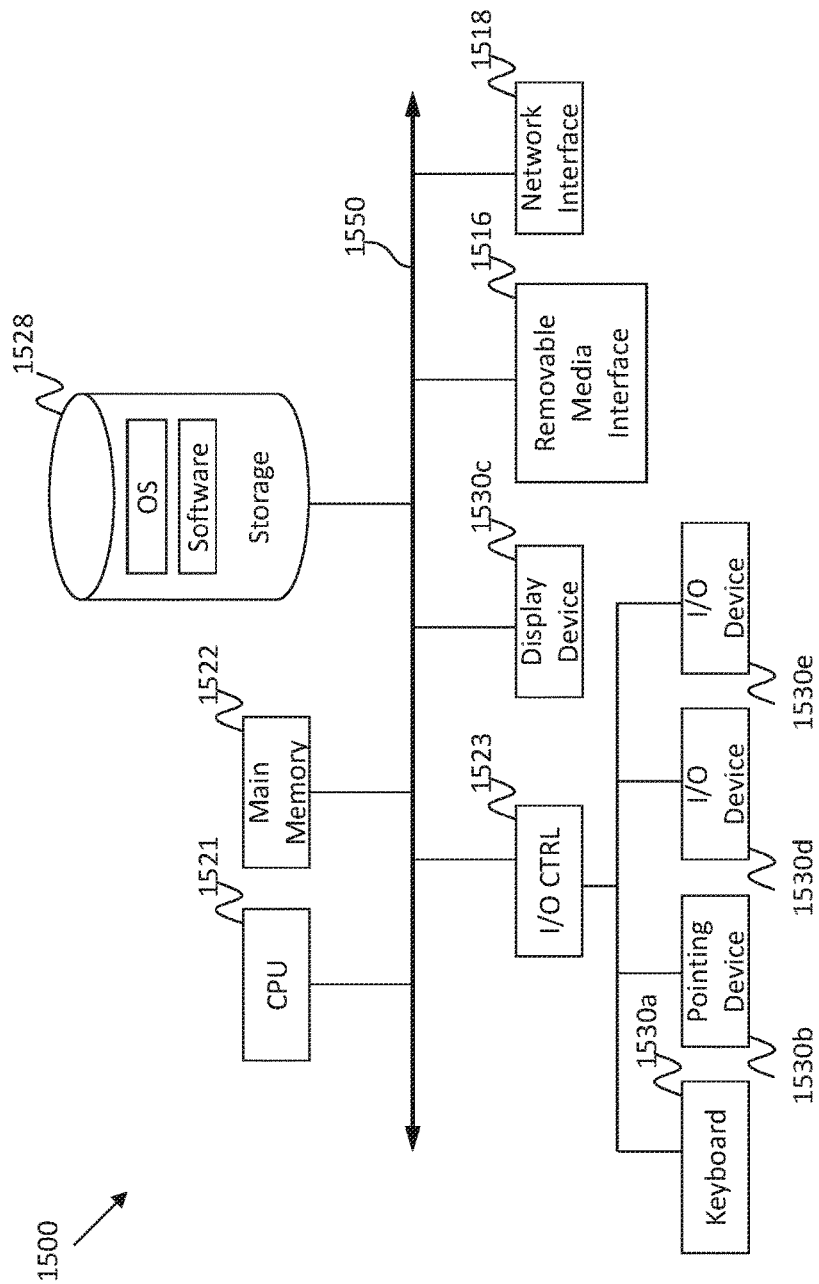
FIG. 9A is a block diagram of a computing device according to an embodiment of the present invention.
Figure 9B:
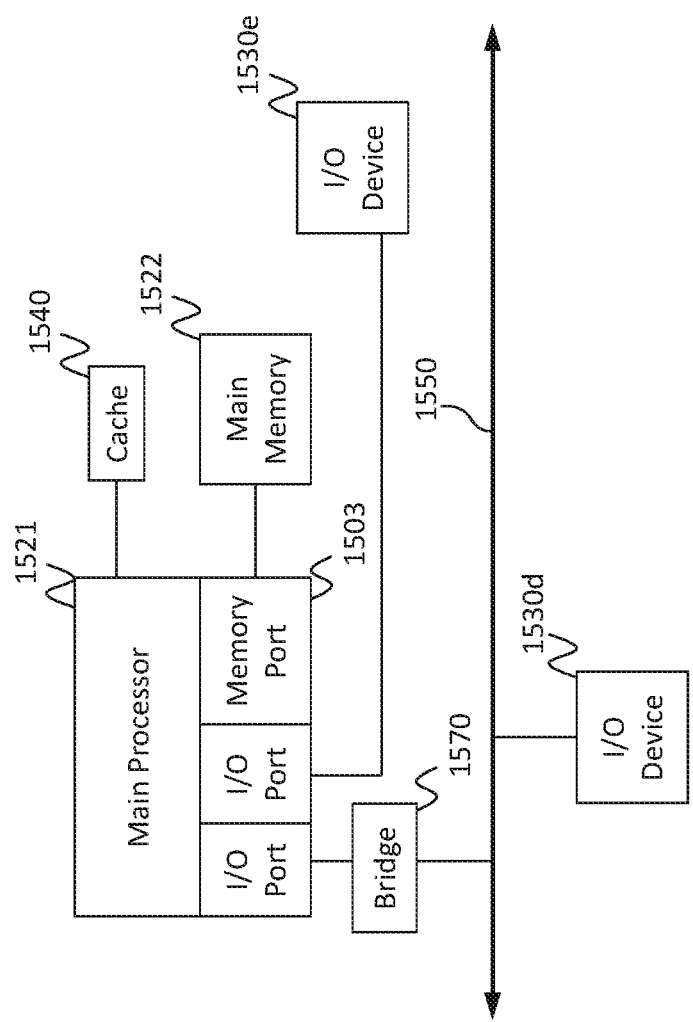
FIG. 9B is a block diagram of a computing device according to an embodiment of the present invention.

FIG. 9A-FIG. 9B depict block diagrams of a computing device 1500 as may be employed in exemplary embodiments of the present invention. Each computing device 1500 includes a central processing unit 1521 and a main memory unit 1522. As shown in FIG. 9A, the computing device 1500 may also include a storage device 1528, a removable media interface 1516, a network interface 1518, an input/output (I/O) controller 1523, one or more display devices 1530c, a keyboard 1530a and a pointing device 1530b, such as a mouse. The storage device 1528 may include, without limitation, storage for an operating system and software. As shown in FIG. 9B, each computing device 1500 may also include additional optional elements, such as a memory port 1503, a bridge 1570, one or more additional input/output devices 1530d, 1530e and a cache memory 1540 in communication with the central processing unit 1521. The input/output devices 1530a, 1530b, 1530d, and 1530e may collectively be referred to herein using reference numeral 1530.

The central processing unit 1521 is any logic circuitry that responds to and processes instructions fetched from the main memory unit 1522. It may be implemented, for example, in an integrated circuit, in the form of a microprocessor, microcontroller, or graphics processing unit (GPU), or in a field-programmable gate array (FPGA) or application-specific integrated circuit (ASIC). The main memory unit 1522 may be one or more memory chips capable of storing data and allowing any storage location to be directly accessed by the central processing unit 1521. As shown in FIG. 9A, the central processing unit 1521 communicates with the main memory 1522 via a system bus 1550. As shown in FIG. 9B, the central processing unit 1521 may also communicate directly with the main memory 1522 via a memory port 1503.

FIG. 9B depicts an embodiment in which the central processing unit 1521 communicates directly with cache memory 1540 via a secondary bus, sometimes referred to as a backside bus. In other embodiments, the central processing unit 1521 communicates with the cache memory 1540 using the system bus 1550. The cache memory 1540 typically has a faster response time than main memory 1522. As shown in FIG. 9A, the central processing unit 1521 communicates with various I/O devices 1530 via the local system bus 1550. Various buses may be used as the local system bus 1550, including a Video Electronics Standards Association (VESA) Local bus (VLB), an Industry Standard Architecture (ISA) bus, an Extended Industry Standard Architecture (EISA) bus, a MicroChannel Architecture (MCA) bus, a Peripheral Component Interconnect (PCI) bus, a PCI Extended (PCI-X) bus, a PCI-Express bus, or a NuBus. For embodiments in which an I/O device is a display device 1530*c*, the central processing unit 1521 may communicate with the display device 1530*c* through an Advanced Graphics Port (AGP). FIG. 9B depicts an embodiment of a computer 1500 in which the central processing unit 1521 communicates directly with I/O device 1530*e*. FIG. 9B also depicts an embodiment in which local busses and direct communication are mixed: the central processing unit 1521 communicates with I/O device 1530*d* using a local system bus 1550 while communicating with I/O device 1530*e* directly.

A wide variety of I/O devices 1530 may be present in the computing device 1500. Input devices include one or more keyboards 1530*a*, mice, trackpads, trackballs, microphones, and drawing tablets. Output devices include video display devices 1530*c*, speakers, and printers. An I/O controller 1523, as shown in FIG. 9A, may control the I/O devices. The I/O controller may control one or more I/O devices such as a keyboard 1530*a* and a pointing device 1530*b*, e.g., a mouse or optical pen.

Referring again to FIG. 9A, the computing device 1500 may support one or more removable media interfaces 1516, such as a floppy disk drive, a CD-ROM drive, a DVD-ROM drive, tape drives of various formats, a USB port, a Secure Digital or COMPACT FLASH™ memory card port, or any other device suitable for reading data from read-only media, or for reading data from, or writing data to, read-write media. An I/O device 1530 may be a bridge between the system bus 1550 and a removable media interface 1516.

The removable media interface 1516 may for example be used for installing software and programs. The computing device 1500 may further include a storage device 1528, such as one or more hard disk drives or hard disk drive arrays, for storing an operating system and other related software, and for storing application software programs. Optionally, a removable media interface 1516 may also be used as the storage device. For example, the operating system and the software may be run from a bootable medium, for example, a bootable CD.

In some embodiments, the computing device 1500 may include or be connected to multiple display devices 1530*c*, which each may be of the same or different type and/or form. As such, any of the I/O devices 1530 and/or the I/O controller 1523 may include any type and/or form of suitable hardware, software, or combination of hardware and software to support, enable or provide for the connection to, and use of, multiple display devices 1530*c* by the computing device 1500. For example, the computing device 1500 may include any type and/or form of video adapter, video card, driver, and/or library to interface, communicate, connect, or otherwise use the display devices 1530*c*. In one embodiment, a video adapter may include multiple connectors to interface to multiple display devices 1530*c*. In other embodiments, the computing device 1500 may include multiple video adapters, with each video adapter connected to one or more of the display devices 1530*c*. In some embodiments, any portion of the operating system of the computing device 1500 may be configured for using multiple display devices 1530*c*. In other embodiments, one or more of the display devices 1530*c* may be provided by one or more other computing devices, connected, for example, to the computing device 1500 via a network. These embodiments may include any type of software designed and constructed to use the display device of another computing device as a second display device 1530*c* for the computing device 1500. One of ordinary skill in the art will recognize and appreciate the various ways and embodiments that a computing device 1500 may be configured to have multiple display devices 1530*c*.

A computing device 1500 of the sort depicted in FIG. 9A-FIG. 9B may operate under the control of an operating system, which controls scheduling of tasks and access to system resources. The computing device 1500 may be running any operating system, any embedded operating system, any real-time operating system, any open source operating system, any proprietary operating system, any operating systems for mobile computing devices, or any other operating system capable of running on the computing device and performing the operations described herein.

The computing device 1500 may be any workstation, desktop computer, laptop or notebook computer, server machine, handheld computer, mobile telephone or other portable telecommunication device, media playing device, gaming system, mobile computing device, or any other type and/or form of computing, telecommunications or media device that is capable of communication and that has sufficient processor power and memory capacity to perform the operations described herein. In some embodiments, the computing device 1500 may have different processors, operating systems, and input devices consistent with the device.

In other embodiments the computing device 1500 is a mobile device, such as a Java-enabled cellular telephone or personal digital assistant (PDA), a smart phone, a digital audio player, or a portable media player. In some embodiments, the computing device 1500 includes a combination of devices, such as a mobile phone combined with a digital audio player or portable media player.

Figures 9C, 9D:
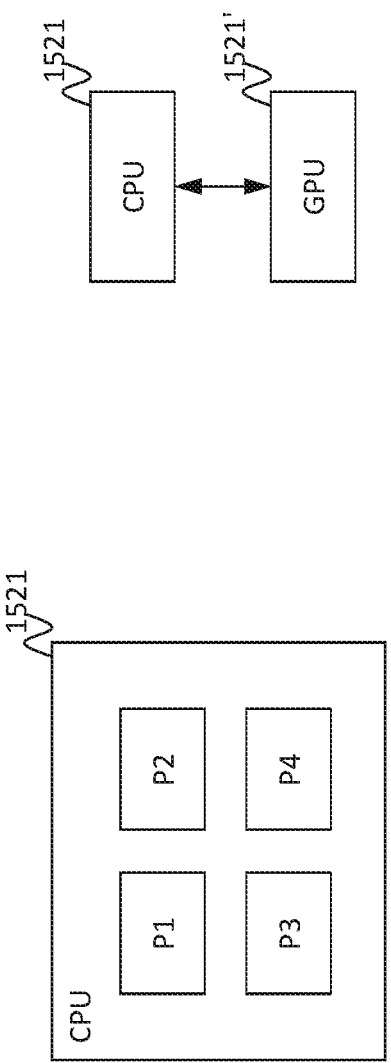
FIG. 9C is a block diagram of a computing device according to an embodiment of the present invention.
FIG. 9D is a block diagram of a computing device according to an embodiment of the present invention.

As shown in FIG. 9C, the central processing unit 1521 may include multiple processors P1, P2, P3, P4, and may provide functionality for simultaneous execution of instructions or for simultaneous execution of one instruction on more than one piece of data. In some embodiments, the computing device 1500 may include a parallel processor with one or more cores. In one of these embodiments, the computing device 1500 is a shared memory parallel device, with multiple processors and/or multiple processor cores, accessing all available memory as a single global address space. In another of these embodiments, the computing device 1500 is a distributed memory parallel device with multiple processors each accessing local memory only. In still another of these embodiments, the computing device 1500 has both some memory which is shared and some memory which may only be accessed by particular processors or subsets of processors. In still even another of these embodiments, the central processing unit 1521 includes a multicore microprocessor, which combines two or more independent processors into a single package, e.g., into a single integrated circuit (IC). In one exemplary embodiment, depicted in FIG. 9D, the computing device 1500 includes at least one central processing unit 1521 and at least one graphics processing unit 1521'.

In some embodiments, a central processing unit 1521 provides single instruction, multiple data (SIMD) functionality, e.g., execution of a single instruction simultaneously on multiple pieces of data. In other embodiments, several processors in the central processing unit 1521 may provide functionality for execution of multiple instructions simultaneously on multiple pieces of data (MIMD). In still other embodiments, the central processing unit 1521 may use any combination of SIMD and MIMD cores in a single device.

Figure 9E:
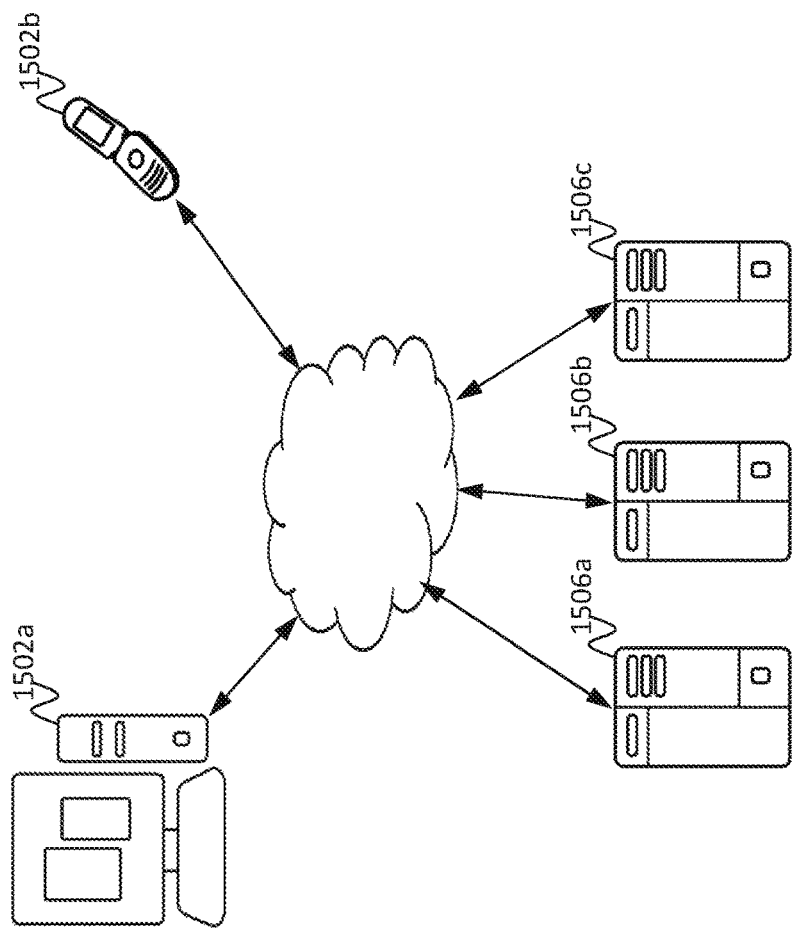
FIG. 9E is a block diagram of a network environment including several computing devices according to an embodiment of the present invention.

A computing device may be one of a plurality of machines connected by a network, or it may include a plurality of machines so connected. FIG. 9E shows an exemplary network environment. The network environment includes one or more local machines 1502*a*, 1502*b* (also generally referred to as local machine(s) 1502, client(s) 1502, client node(s) 1502, client machine(s) 1502, client computer(s) 1502, client device(s) 1502, endpoint(s) 1502, or endpoint node(s) 1502) in communication with one or more remote machines 1506*a*, 1506*b*, 1506*c* (also generally referred to as server machine(s) 1506 or remote machine(s) 1506) via one or more networks 1504. In some embodiments, a local machine 1502 has the capacity to function as both a client node seeking access to resources provided by a server machine and as a server machine providing access to hosted resources for other clients 1502*a*, 1502*b*. Although only two clients 1502 and three server machines 1506 are illustrated in FIG. 9E, there may, in general, be an arbitrary number of each. The network 1504 may be a local-area network (LAN), e.g., a private network such as a company Intranet, a metropolitan area network (MAN), or a wide area network (WAN), such as the Internet, or another public network, or a combination thereof.

The computing device 1500 may include a network interface 1518 to interface to the network 1504 through a variety of connections including, but not limited to, standard telephone lines, local-area network (LAN), or wide area network (WAN) links, broadband connections, wireless connections, or a combination of any or all of the above. Connections may be established using a variety of communication protocols. In one embodiment, the computing device 1500 communicates with other computing devices 1500 via any type and/or form of gateway or tunneling protocol such as Secure Socket Layer (SSL) or Transport Layer Security (TLS). The network interface 1518 may include a built-in network adapter, such as a network interface card, suitable for interfacing the computing device 1500 to any type of network capable of communication and performing the operations described herein. An I/O device 1530 may be a bridge between the system bus 1550 and an external communication bus.

According to one embodiment, the network environment of FIG. 9E may be a virtual network environment where the various components of the network are virtualized. For example, the various machines 1502 may be virtual machines implemented as a software-based computer running on a physical machine. The virtual machines may share the same operating system. In other embodiments, different operating system may be run on each virtual machine instance. According to one embodiment, a "hypervisor" type of virtualization is implemented where multiple virtual machines run on the same host physical machine, each acting as if it has its own dedicated box. Of course, the virtual machines may also run on different host physical machines.

Other types of virtualization is also contemplated, such as, for example, the network (e.g. via Software Defined Networking (SDN)). Functions, such as functions of the session border controller and other types of functions, may also be virtualized, such as, for example, via Network Functions Virtualization (NFV).

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A method for customizing a language model for speech recognition in a context, the method comprising:
    receiving, by a processor, non-speech text from the context, the context comprising communications with an enterprise, the communications comprising voice interactions and non-speech communications;
    selecting, by the processor, text from the non-speech text;
    converting, by the processor, the selected non-speech text to generate converted non-speech text comprising a plurality of phrases consistent with speech transcription text;
    customizing, by the processor, a language model for the context using the converted non-speech text, the language model being customized to compute a probability that a given speech input phrase appears in voice interactions in the context of the communications with the enterprise; and
    outputting, by the processor, the language model.

2. The method of claim 1, wherein the non-speech text comprises at least one from the group consisting of:
    an email;
    a forum post;
    a transcript of a text chat interaction; or
    a text message.

3. The method of claim 1, wherein the converting the selected non-speech text comprises:
    removing metadata from the non-speech text;
    splitting the non-speech text into a plurality of sentences;
    converting one or more words of the sentences to spoken form;
    correcting one or more spelling errors in the sentences;
    identifying one or more duplicate sentences; and
    removing duplicate sentences.

4. The method of claim 1, wherein the selecting the text comprises:
    for each in-vocabulary word in a lexicon of in-vocabulary words,
        identifying one or more sentences containing the in-vocabulary word;
        counting the one or more sentences to identify a count of the in-vocabulary word in the non-speech text;
        comparing the count to a first threshold; and adding the identified one or more sentences containing the in-vocabulary word in response to determining that the count satisfies the first threshold;

identifying one or more out-of-vocabulary words comprising words that are in the sentences and not in the lexicon;

for each out-of-vocabulary word of the out-of-vocabulary words:

identifying one or more sentences containing the out-of-vocabulary word;

counting the one or more sentences to identify a count of the out-of-vocabulary word in the non-speech text;

comparing the count to a second threshold;

computing a first likelihood of encountering the out-of-vocabulary word in the sentence among all of the identified sentences;

identifying one or more spelling suggestions for the out-of-vocabulary word;

computing a plurality of second likelihoods, each of the second likelihoods corresponding to a second likelihood of encountering each of the spelling suggestions in the sentence;

adding the identified sentences to an output set of selected text in response to determining that the count satisfies a threshold and that at all of the second likelihoods are less than the first likelihood; and outputting the output set of selected text.

5. The method of claim 4, wherein the computing the first likelihood comprises counting occurrences of the out-of-vocabulary word preceded by one or more history words in the non-speech text; and wherein the computing one of the second likelihoods comprises counting occurrences of a corresponding spelling suggestion of the spelling suggestions preceded by the one or more history words in the non-speech text.

6. A method for selecting, from non-speech text, training data for a language model for speech recognition, the method comprising:

training, by a processor, a non-speech language model based on the non-speech text;

for each unique sentence of the non-speech text:

computing and normalizing, by the processor, an out-of-domain score of the unique sentence based on non-speech language model;

computing and normalizing, by the processor, an in-domain score of the unique sentence based on a speech transcription language model trained based on generic speech transcription training data;

comparing, by the processor, the out-of-domain score to the in-domain score; and adding, by the processor, the unique sentence to an output set of selected text in response to determining that the in-domain score exceeds the out-of-domain score by a threshold; and outputting, by the processor, the output set of selected text.

7. The method of claim 6, further comprising scaling a count of each unique sentence in the output set by P(s), where:

$$P(s) = e^{IDScr'}$$

where s is the unique sentence and where IDScr' is the in-domain score of the unique sentence.

8. A method for selecting, from non-speech text, training data for a language model for speech recognition, the method comprising:

initializing, by a processor, an output set of selected text based a plurality of sentences sampled from the non-speech text;

for each unique sentence of the non-speech text:

computing, by the processor, a first divergence between an in-domain language model trained on generic speech transcript text the unique sentence and a language model trained on the output set;

computing, by the processor, a second divergence between the in-domain language model and a language model trained on the output set combined with the unique sentence;

comparing, by the processor, the first divergence and the second divergence; and adding, by the processor, the sentence to the output set in response to determining that the second divergence in less than the first divergence; and outputting, by the processor, the output set of selected text.

9. The method of claim 8, wherein the computing the second divergence comprises calculating a cross-entropy of the in-domain language model and the language model trained on the output set.

10. A system comprising:

a processor;

memory storing instructions that, when executed by the processor, cause the processor to:

receive non-speech text from a context comprising communications with an enterprise, the communications comprising voice interactions and non-speech communications;

select text from the non-speech text;

convert the selected non-speech text to generate converted non-speech text comprising a plurality of phrases consistent with speech transcription text;

customize a language model for the context using a converted non-speech text, the language model being customized to compute a probability that a given speech input phrase appears in voice interactions in the context of the communications with the enterprise; and output the language model.

11. The system of claim 10, wherein the non-speech text comprises-at least one from the group consisting of:

an email;

a forum post;

a transcript of a text chat interaction; or a text message.

12. The system of claim 10, wherein the memory further stores instructions that, when executed by the processor, cause the processor to convert the selected non-speech text by:

removing metadata from the non-speech text;

splitting the non-speech text into a plurality of sentences;

converting one or more words of the sentences to spoken form;

correcting one or more spelling errors in the sentences;

identifying one or more duplicate sentences; and removing duplicate sentences.

13. The system of claim 10, wherein the memory further stores instructions that, when executed by the processor, cause the processor to select the text by:

for each in-vocabulary word in a lexicon of in-vocabulary words, identifying one or more sentences containing the in-vocabulary word;
counting the one or more sentences to identify a count of the in-vocabulary word in the non-speech text;
comparing the count to a first threshold; and
adding the identified one or more sentences containing the in-vocabulary word in response to determining that the count satisfies the first threshold;
identifying one or more out-of-vocabulary words comprising words that are in the sentences and not in the lexicon;
for each out-of-vocabulary word of the out-of-vocabulary words:
identifying one or more sentences containing the out-of-vocabulary word;
counting the one or more sentences to identify a count of the out-of-vocabulary word in the non-speech text;
comparing the count to a second threshold;
computing a first likelihood of encountering the out-of-vocabulary word in the sentence among all of the identified sentences;
identifying one or more spelling suggestions for the out-of-vocabulary word;
computing a plurality of second likelihoods, each of the second likelihoods corresponding to a second likelihood of encountering each of the spelling suggestions in the sentence;
adding the identified sentences to an output set of selected text in response to determining that the count satisfies a threshold and that at all of the second likelihoods are less than the first likelihood; and
outputting the output set of selected text.

14. The system of claim 13, wherein the computing the first likelihood comprises counting occurrences of the out-of-vocabulary word preceded by one or more history words in the non-speech text; and
wherein the computing one of the second likelihoods comprises counting occurrences of a corresponding spelling suggestion of the spelling suggestions preceded by the one or more history words in the non-speech text.

15. A system comprising:
a processor; and
memory storing instructions that, when executed by the processor, cause the processor to:
train a non-speech language model based on the non-speech text;
for each unique sentence of the non-speech text:
compute and normalize an out-of-domain score of the unique sentence based on non-speech language model;
compute and normalize an in-domain score of the unique sentence based on a speech transcription language model trained based on generic speech transcription training data;
compare the out-of-domain score to the in-domain score; and
add the unique sentence to an output set of selected text in response to determining that the in-domain score exceeds the out-of-domain score by a threshold; and
output the output set of selected text.

16. The system of claim 15, wherein the memory further stores instructions that, when executed by the processor, cause the processor to scale a count of each unique sentence in the output set by P(s), where:

$$P(s)=e^{IDScr'}$$

where s is the unique sentence and where IDScr' is the in-domain score of the unique sentence.

17. A system comprising:
a processor; and
memory storing instructions that, when executed by the processor, cause the processor to:
initialize an output set of selected text based a plurality of sentences sampled from the non-speech text;
for each unique sentence of the non-speech text:
compute a first divergence between an in-domain language model trained on generic speech transcript text the unique sentence and a language model trained on the output set;
compute a second divergence between the in-domain language model and a language model trained on the output set combined with the unique sentence;
compare the first divergence and the second divergence; and
add the sentence to the output set in response to determining that the second divergence in less than the first divergence; and
output the output set of selected text.

18. The system of claim 17, wherein the memory further stores instructions that, when executed by the processor, cause the processor to compute the second divergence by calculating a cross-entropy of the in-domain language model and the language model trained on the output set.

* * * * *

UNITED STATES PATENT AND TRADEMARK OFFICE
CERTIFICATE OF CORRECTION

PATENT NO. : 10,311,859 B2
APPLICATION NO. : 15/247656
DATED : June 4, 2019
INVENTOR(S) : Amir Lev-Tov et al.

Page 1 of 1

It is certified that error appears in the above-identified patent and that said Letters Patent is hereby corrected as shown below:

In the Claims
Column 38, Line 39, Claim 10 delete "using a" and insert -- using the --

Signed and Sealed this
Seventeenth Day of March, 2020

Andrei Iancu
*Director of the United States Patent and Trademark Office*